(12) United States Patent
Pettinga

(10) Patent No.: US 12,286,302 B2
(45) Date of Patent: Apr. 29, 2025

(54) ROLLER CONVEYOR GAP BLOCKER

(71) Applicant: Flexible Steel Lacing Company, Downers Grove, IL (US)

(72) Inventor: Mark Steven Pettinga, Grandville, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 64 days.

(21) Appl. No.: 17/951,748

(22) Filed: Sep. 23, 2022

(65) Prior Publication Data

US 2023/0102050 A1   Mar. 30, 2023

Related U.S. Application Data

(60) Provisional application No. 63/257,789, filed on Oct. 20, 2021, provisional application No. 63/248,196, filed on Sep. 24, 2021.

(51) Int. Cl.
*B65G 13/02* (2006.01)
(52) U.S. Cl.
CPC .................................. *B65G 13/02* (2013.01)
(58) Field of Classification Search
None
See application file for complete search history.

(56) References Cited

U.S. PATENT DOCUMENTS

| | | | |
|---|---|---|---|
| 2,232,081 A | 2/1941 | Sloane | |
| 2,237,345 A | 4/1941 | Frentzel, Jr. et al. | |
| 2,268,724 A | 1/1942 | Shackelford | |
| 2,517,983 A | 8/1950 | Crosland | |
| 2,536,961 A | 1/1951 | Smith | |
| 2,624,444 A | 1/1953 | Casabona | |
| 2,627,960 A | 2/1953 | Eberle | |

(Continued)

FOREIGN PATENT DOCUMENTS

| CN | 1135668 | 11/1996 |
|---|---|---|
| CN | 2420247 | 2/2001 |

(Continued)

OTHER PUBLICATIONS

Notification of Transmittal of the International Search Report and the Written Opinion of the International Searching Authority, or the Declaration from the International Bureau of WIPO issued in International Application No. PCT/US22/44568 on Jan. 3, 2023, 25 pages.

(Continued)

*Primary Examiner* — Kavel Singh
(74) *Attorney, Agent, or Firm* — Fitch, Even, Tabin & Flannery LLP

(57) ABSTRACT

In one aspect, a gap blocker is provided for a roller conveyor having rollers for conveying an object in a downstream longitudinal direction. The rollers include adjacent rollers having a longitudinally extending gap therebetween and at least one of the rollers has an annular groove for receiving a drive member. The gap blocker includes a body configured to be supported in the gap by the adjacent rollers and an upper blocking portion of the body to extend across the gap. The body further includes a locating member configured to extend into the annular groove and inhibit lateral movement of the body in the gap.

49 Claims, 25 Drawing Sheets

(56) References Cited

U.S. PATENT DOCUMENTS

| | | |
|---|---|---|
| 2,862,599 A | 12/1958 | Sinden |
| 2,899,086 A | 8/1959 | Saint-Andre |
| D209,071 S | 10/1967 | Koch |
| 3,345,957 A | 10/1967 | Welch |
| D209,421 S | 11/1967 | Fabian |
| 3,465,489 A | 9/1969 | Monaghan |
| 3,548,996 A | 12/1970 | Ellis |
| 3,587,674 A | 6/1971 | Adkin |
| 3,623,598 A | 11/1971 | Anfossi |
| 3,738,650 A | 6/1973 | Ossenkop et al. |
| 3,878,735 A | 4/1975 | Preuss |
| 3,988,880 A | 11/1976 | Miyazaki et al. |
| 4,096,943 A | 6/1978 | Gentsch |
| 4,132,304 A | 1/1979 | Gent |
| 4,288,208 A | 9/1981 | Kusters |
| 4,579,219 A | 4/1986 | Burkhardt |
| 4,613,036 A | 9/1986 | Bourgeois |
| 4,718,543 A | 1/1988 | Leisner et al. |
| D303,974 S | 10/1989 | Karr |
| 4,901,845 A | 2/1990 | Zoergiebel |
| 4,989,723 A | 2/1991 | Bode et al. |
| 5,009,307 A | 4/1991 | Chance et al. |
| 5,044,485 A | 9/1991 | Loder |
| 5,065,222 A | 11/1991 | Ishii |
| 5,215,182 A | 6/1993 | Garbagnati |
| 5,311,982 A | 5/1994 | Clopton |
| 5,311,983 A | 5/1994 | Clopton |
| 5,320,478 A | 6/1994 | Gonsowski et al. |
| 5,324,582 A | 6/1994 | Goto |
| 5,344,001 A | 9/1994 | Kawaai et al. |
| 5,409,096 A | 4/1995 | Clopton |
| 5,584,373 A | 12/1996 | Layne |
| 5,597,062 A | 1/1997 | Biwer |
| 5,597,063 A | 1/1997 | Bogle et al. |
| 5,695,042 A | 12/1997 | Van Der Burgt |
| D407,174 S | 3/1999 | Baker |
| 5,957,265 A | 9/1999 | Clopton |
| 5,971,129 A | 10/1999 | Stawniak et al. |
| D419,742 S | 1/2000 | Abbestam |
| 6,138,819 A | 10/2000 | Bogle et al. |
| 6,164,435 A | 12/2000 | Coen et al. |
| 6,550,604 B2 | 4/2003 | Maclachlan |
| 6,589,631 B1 | 7/2003 | Suzuki |
| 6,630,633 B1 | 10/2003 | Uber et al. |
| D483,168 S | 12/2003 | McDaniel |
| D484,545 S | 12/2003 | McIlvaine |
| D493,933 S | 8/2004 | Schwagermann |
| 6,848,583 B2 | 2/2005 | Largent |
| 6,896,122 B2 | 5/2005 | Gambrell et al. |
| 6,959,803 B1 | 11/2005 | Layne et al. |
| 7,137,505 B2 | 11/2006 | Stebnicki |
| 7,210,569 B1 | 5/2007 | Tarhan et al. |
| D547,523 S | 7/2007 | Swinderman |
| 7,258,225 B2 | 8/2007 | Hall |
| D553,824 S | 10/2007 | Rijksen |
| 7,287,640 B1 | 10/2007 | Schmutzler |
| 7,413,088 B2 | 8/2008 | Temler |
| 7,523,820 B1 | 4/2009 | Wu et al. |
| D611,673 S | 3/2010 | Andrews |
| 7,673,732 B2 | 3/2010 | Underberg |
| 7,721,874 B2 | 5/2010 | Chen |
| 7,882,944 B1 | 2/2011 | Eubanks |
| D635,847 S | 4/2011 | Olsson |
| D643,709 S | 8/2011 | Olsson |
| 8,042,682 B2 | 10/2011 | Ertel |
| D650,143 S | 12/2011 | Bhosale |
| 8,162,133 B2 | 4/2012 | Ruge |
| 8,196,736 B2 | 6/2012 | Wagner |
| 8,210,341 B2 | 7/2012 | Marshall et al. |
| 8,365,899 B2 | 2/2013 | McKee |
| 8,567,591 B2 | 10/2013 | Gonzalez Alemany et al. |
| 9,022,207 B2 | 5/2015 | Tully et al. |
| 9,022,210 B2 | 5/2015 | Tully |
| 9,027,738 B2 | 5/2015 | Coen |
| 9,290,333 B2 | 3/2016 | Skanse |
| 9,452,896 B2 | 9/2016 | Lee |
| 9,550,625 B2 | 1/2017 | Specht |
| D780,399 S | 2/2017 | Pettinga |
| 9,643,784 B2 | 5/2017 | Guerra |
| 9,663,306 B2 | 5/2017 | Pettinga |
| D789,643 S | 6/2017 | Pettinga |
| 9,694,987 B1 | 7/2017 | Schroader |
| 9,758,317 B2 | 9/2017 | Sammauro |
| D819,921 S | 6/2018 | Pettinga |
| 10,092,122 B2 | 10/2018 | Bing |
| 10,112,131 B2 | 10/2018 | Yoon |
| 10,233,035 B2 | 3/2019 | Pettinga |
| 10,343,853 B2 | 7/2019 | Yasinski |
| 10,376,938 B2 | 8/2019 | Frauenhuber |
| 10,427,891 B2 | 10/2019 | McKee |
| 10,556,755 B2 | 2/2020 | Pettinga |
| 10,646,898 B2 | 5/2020 | Hillerich, Jr. |
| 10,654,652 B1 | 5/2020 | Folickman |
| 10,913,616 B2 | 2/2021 | Pettinga |
| 10,926,955 B1 * | 2/2021 | Malina .................. B65G 13/11 |
| 11,136,194 B2 | 10/2021 | Sathiyanarayanan |
| 11,186,448 B2 | 11/2021 | Pettinga |
| 11,597,604 B1 | 3/2023 | Simon |
| 11,597,608 B2 | 3/2023 | Pettinga |
| 11,629,010 B1 * | 4/2023 | DeFant .................. B65G 13/07 |
| | | 198/790 |
| 11,661,283 B2 | 5/2023 | Pettinga |
| 11,713,199 B2 | 8/2023 | Pettinga |
| 2005/0173858 A1 | 8/2005 | Temler et al. |
| 2006/0070966 A1 | 4/2006 | Koudys et al. |
| 2006/0108204 A1 | 5/2006 | Marsetti |
| 2007/0023257 A1 | 2/2007 | Schiesser |
| 2008/0296129 A1 | 12/2008 | Yagi et al. |
| 2009/0084659 A1 | 4/2009 | Underberg |
| 2010/0108467 A1 | 5/2010 | Barreyre et al. |
| 2010/0230247 A1 | 9/2010 | McKee |
| 2011/0132725 A1 | 6/2011 | Marshall et al. |
| 2014/0182733 A1 | 7/2014 | Mettee, II |
| 2014/0183002 A1 | 7/2014 | Tully |
| 2014/0183006 A1 | 7/2014 | Tully |
| 2014/0262684 A1 | 9/2014 | Skanse |
| 2015/0291368 A1 | 10/2015 | Pettinga |
| 2016/0214154 A1 | 7/2016 | Frauenhuber |
| 2017/0008705 A1 | 1/2017 | Sammauro |
| 2017/0055749 A1 | 3/2017 | Bing |
| 2017/0174444 A1 | 6/2017 | Schroader |
| 2017/0246564 A1 | 8/2017 | Yoon |
| 2017/0275102 A1 | 9/2017 | Pettinga |
| 2018/0265309 A1 | 9/2018 | Yasinski |
| 2018/0345324 A1 | 12/2018 | Hillerich, Jr. |
| 2019/0002209 A1 | 1/2019 | McKee |
| 2020/0346868 A1 | 11/2020 | Sathiyanarayanan |
| 2021/0101757 A1 | 4/2021 | Pettinga |
| 2021/0179365 A1 | 6/2021 | Pettinga |
| 2022/0089374 A1 | 3/2022 | Pettinga |
| 2022/0162016 A1 | 5/2022 | Pettinga |
| 2023/0098268 A1 | 3/2023 | Pettinga |
| 2023/0102050 A1 | 3/2023 | Pettinga |

FOREIGN PATENT DOCUMENTS

| | | |
|---|---|---|
| CN | 101056807 A | 10/2007 |
| CN | 101074070 A | 11/2007 |
| CN | 101880126 A | 11/2010 |
| CN | 102695662 A | 9/2012 |
| CN | 102887423 A | 1/2013 |
| CN | 203448352 U | 2/2014 |
| CN | 104870340 A | 8/2015 |
| CN | 110691744 | 1/2020 |
| CN | 112010006 A | 12/2020 |
| DE | 3014608 | 10/1981 |
| DE | 3224557 | 1/1984 |
| DE | 8700878 | 3/1987 |
| DE | 9212012 U1 | 12/1992 |
| DE | 19858521 | 6/2000 |
| DE | 202006003116 | 4/2006 |
| EP | 0156113 | 10/1985 |
| EP | 0290255 | 11/1988 |
| EP | 0778229 | 6/1997 |

(56) References Cited

FOREIGN PATENT DOCUMENTS

| | | |
|---|---|---|
| EP | 0906879 | 4/1999 |
| EP | 0919493 | 6/1999 |
| EP | 2332865 A1 | 6/2011 |
| FR | 1561799 | 3/1969 |
| GB | 842230 | 7/1960 |
| GB | 1116571 | 6/1968 |
| GB | 1352993 | 5/1974 |
| JP | H07248011 | 9/1995 |
| JP | H08133459 A | 5/1996 |
| JP | H115264 | 1/1999 |
| JP | H11199038 | 7/1999 |
| JP | 2000177836 | 6/2000 |
| JP | 2001233447 A | 8/2001 |
| JP | 2005261873 A | 9/2005 |
| JP | 2007155007 | 6/2007 |
| JP | 5181355 | 4/2013 |
| JP | 2019210100 | 12/2019 |
| KR | 101299596 | 8/2013 |
| NL | 2002344 | 6/2010 |
| SU | 590213 | 1/1978 |
| SU | 1159859 | 6/1985 |
| SU | 1328266 | 8/1987 |
| WO | 9856694 A1 | 12/1998 |
| WO | 2011071743 | 6/2011 |
| WO | 2012140269 | 10/2012 |
| WO | 2014106062 | 7/2014 |
| WO | 2017111976 | 6/2017 |
| WO | 2018191122 | 10/2018 |
| WO | 2020216783 | 10/2020 |

OTHER PUBLICATIONS

English Translation of 1st Rectification Notice mailed Dec. 9, 2022 in Chinese Application No. 202222547057.6, 3 pages.
U.S. Appl. No. 18/075,184, filed Dec. 5, 2022; 153 pages.
U.S. Appl. No. 63/323,960, filed Mar. 25, 2022; 50 pages.
U.S. Appl. No. 63/316,344, filed Mar. 3, 2022; 36 pages.
U.S. Appl. No. 29/829,490, filed Mar. 4, 2022; 24 pages.
U.S. Appl. No. 18/117,076, filed Mar. 3, 2023; 84 pages.
U.S. Appl. No. 18/125,417, filed Mar. 23, 2023; 45 pages.
U.S. Appl. No. 18/213,678, filed Jun. 23, 2023, 142 pages.
U.S. Application No. 29/898,156, filed Jul. 24, 2023, 10 pages.
U.S. Appl. No. 63/528,572, filed Jul. 24, 2023, 25 pages.
U.S. Appl. No. 18/198,942, filed May 18, 2023, 39 pages.

* cited by examiner

ROLLER CONVEYOR GAP BLOCKER

CROSS REFERENCE TO RELATED APPLICATIONS

This application claims benefit under 35 U.S.C. § 119(e) to U.S. Provisional Application No. 63/248,196, filed Sep. 24, 2021, and U.S. Provisional Application No. 63/257,789, filed Oct. 20, 2021, which are hereby incorporated by reference herein in their entireties.

FIELD

This disclosure relates to gap blockers for roller conveyors and, more specifically, to roller conveyors having drive members that transfer rotation of one roller to another roller.

BACKGROUND

Some roller conveyors have rollers and drive members such as bands that engage in grooves of the rollers for transferring rotation from one roller to an adjacent roller. The drive band extends about the rollers in the grooves and has upper and lower runs that extend across a gap between the adjacent rollers. The areas of the roller conveyor where the drive band enters and exits the grooves of the rollers create potential pinch points that may be a hazard for workers. For example, a worker's glove may become caught between the drive bands and rollers as the roller conveyor conveys an object.

SUMMARY

In accordance with one aspect of the present disclosure, a gap blocker is provided for a roller conveyor having rollers for conveying an object in a downstream longitudinal direction. The rollers include adjacent rollers having a longitudinally extending gap therebetween and at least one of the adjacent rollers has an annular groove for receiving a drive member. The gap blocker includes a body configured to be supported in the gap by the rollers and an upper blocking portion of the body to extend across the gap. The body further includes a locating member configured to extend into the annular groove and inhibit lateral movement of the body in the gap. In this manner, the interference between the locating member and the roller annular groove keeps the gap blocker body at a predetermined lateral position along the adjacent rollers. Keeping the gap blocker body at a predetermined lateral position along the adjacent rollers may be beneficial, for example, to ensure the gap blocker remains below the drive member to take up space below the drive member and reduce the likelihood of an object being pinched between the drive member and the downstream roller.

The present disclosure also is directed to a drive member protector for a roller conveyor having rollers, a gap between a pair of adjacent rollers, and a drive member for rotating the adjacent rollers. The drive member protector includes a body for being positioned in the gap and an upper portion of the body having a recess to be positioned below an upper run of the drive member. The upper portion has raised portions extending along either side of the recess to inhibit ingress of an object between the drive member and the upper portion of the body. The raised portions on either side of the recess operates as a barrier to limit or block advancing of an object into the areas between the drive member and the adjacent rollers so that the object is kept out of the pinch points formed by the drive member and the adjacent rollers.

In another aspect of the present disclosure, a roller conveyor system is provided that includes an upstream roller having an upstream groove, a downstream roller having a downstream groove, and a gap between the upstream and downstream rollers. The upstream and downstream rollers are rotatable to convey an object in a downstream longitudinal direction. The roller conveyor system includes a gap blocker supported by the upstream and downstream rollers in the gap and a drive member engaged in the upstream and downstream grooves of the upstream and downstream rollers. The roller conveyor system further includes engaging portions of the gap blocker and at least one of the upstream and downstream grooves that resist lateral movement of the gap blocker laterally along the upstream and downstream rollers. The engaging portions of the gap blocker and the groove inhibit wandering of the gap blocker laterally in the gap out from and away from the groove such that the gap blocker remains in position, e.g., below the drive member, to block objects from falling into the gap beyond the gap blocker and to keep the drive band from being pushed downward into the gap beyond the gap blocker.

DETAILED DESCRIPTION

Figure 1:
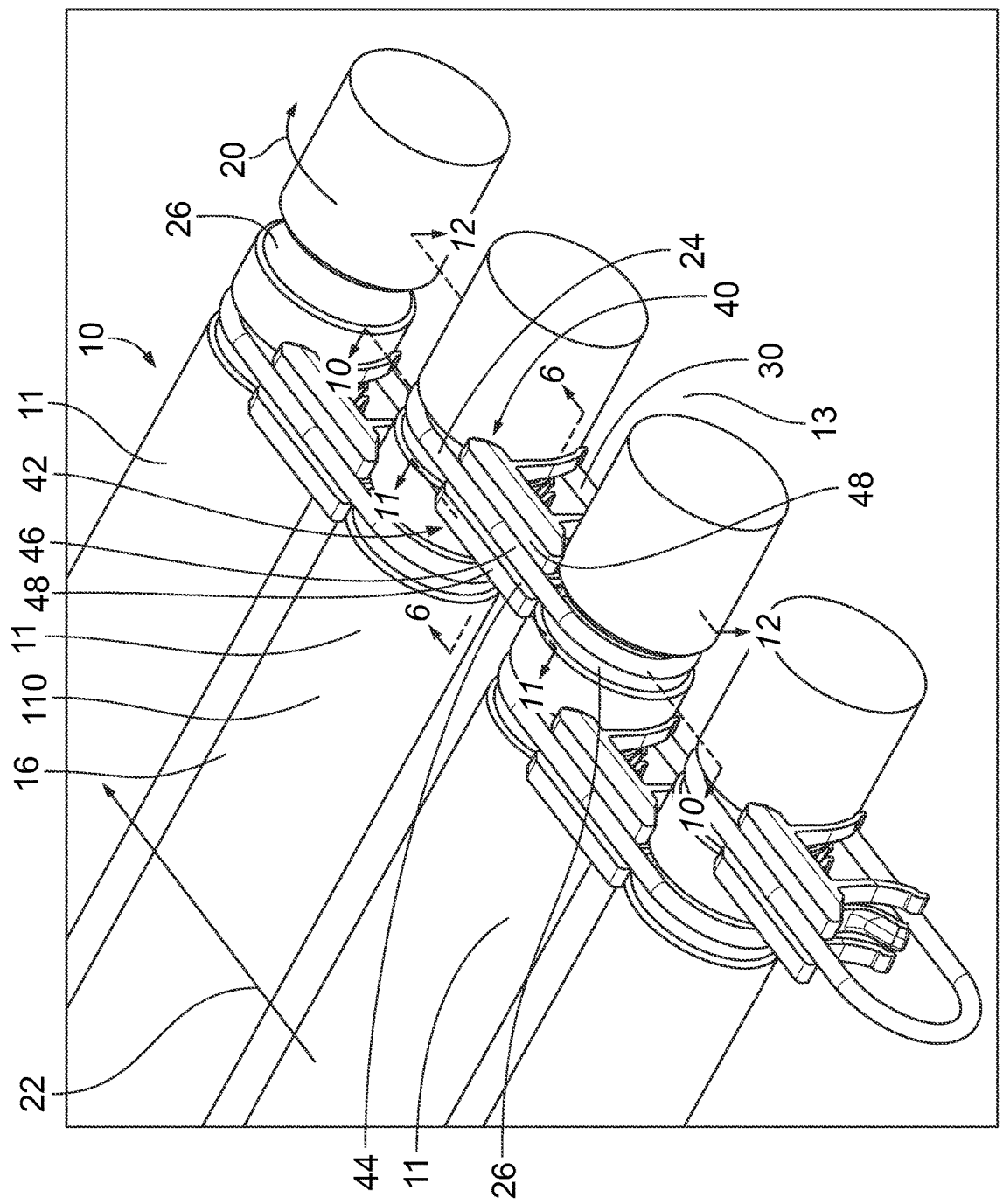
FIG. 1 is a perspective view of a roller conveyor including rollers having annular grooves, drive bands received in the grooves of the rollers, and drive member protectors in the gaps between the rollers to protect the drive bands.

With regard to FIG. 1, a roller conveyor 10 is provided having rollers 11 that rotate in rotary direction 20 to convey an object in a downstream longitudinal direction 22. The rollers 11 are separated by gaps 13. One of the upstream rollers 11 may be turned by a motor, for example, and the roller conveyor 10 has drive members, such as chains or drive bands 24, engaging in grooves 26 of the rollers 11 to transfer rotation of one of the rollers 11 to an adjacent one of the rollers 11. Each roller 11 has two laterally offset grooves 26 and the drive bands 24 are installed in the laterally alternating position, as shown in FIG. 1. The drive bands 24 engage surface portions of the grooves 26 of the rollers 11 so that as the rollers 11 rotate and the drive bands 24 travel about and between the rollers 11 the drive bands 24 have an upper run 28 and a lower run 30 that extend across a gap 32 between the rollers 11. The drive bands 24 also have curved portions 34, 36 that extend about the rollers 11 in the grooves 26 and connect the upper and lower runs 28, 30 of the drive bands 24.

The roller conveyor 10 includes gap blockers, such as drive member protectors 40, for the gaps 13 and drive bands 24. The roller conveyor 10 has one drive member protector for each drive band 24 but, in other embodiments, the roller conveyor may have a drive member protector 40 for two or more drive bands 24 or two or more drive member protectors for a single drive band 24. The drive member protector 40 may be substantially identical and each have an upper portion 42 with a channel 43 that includes a recess 44 that receives an upper portion 46 of the drive band upper run 28. The upper portion 46 also has raised portions 48 on either side of the channel recess 44 that extend along the drive band upper portion 46 and block areas between the drive band 24 and rollers 11 that can serve as pinch points. In this manner, the drive member protectors 40 are operable to inhibit objects, such as a glove, from being pinched between the drive band 24 and the rollers 11. The raised portions 48 also facilitate sliding of a conveyed object across upper surfaces 64 (see FIG. 3) of the raised portions 48 rather than undesirably having the conveyed object contacting the drive band 24.

Figure 2:
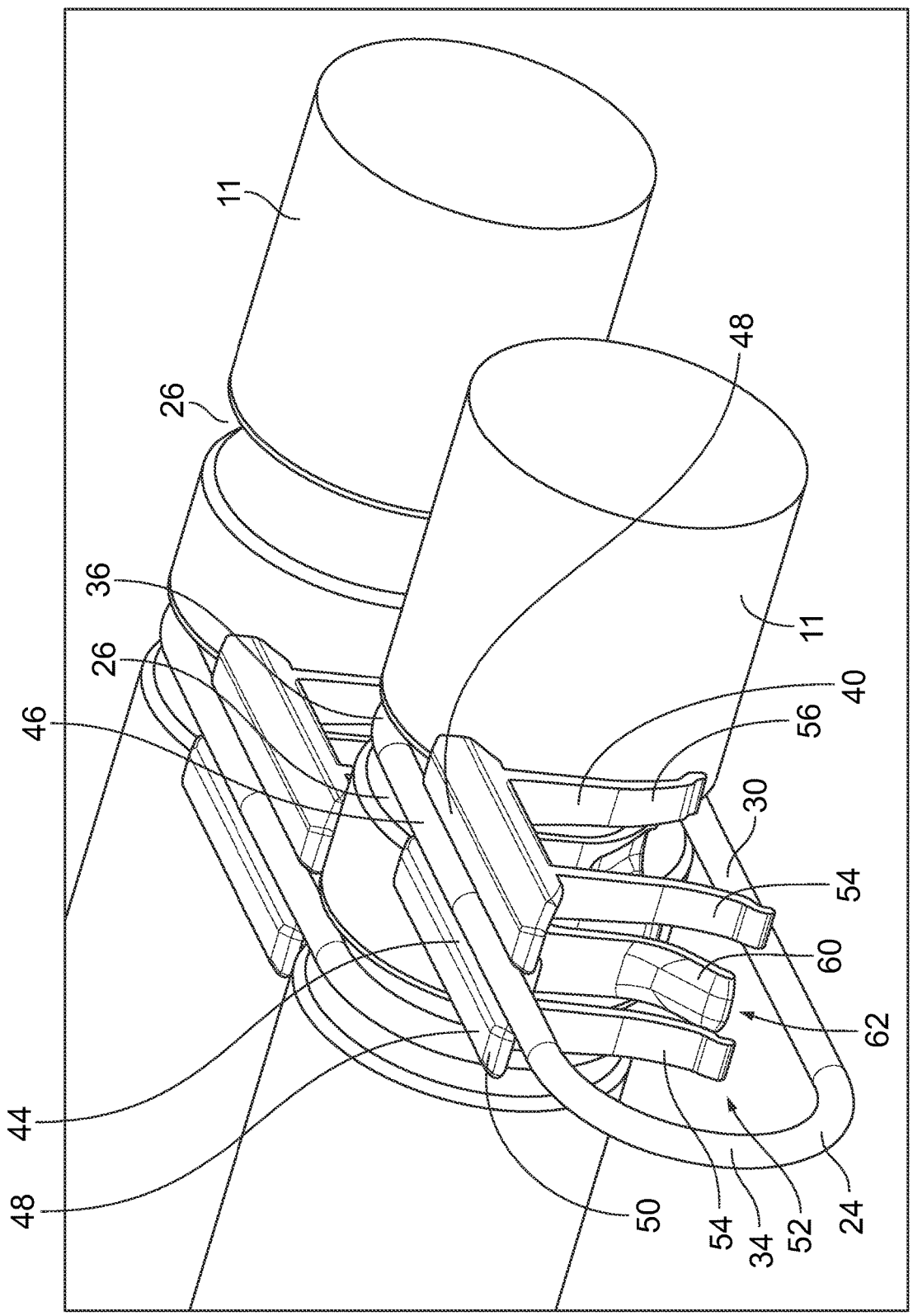
FIG. 2 is a perspective view of a portion of the roller conveyor of FIG. 1 with one of the rollers removed to show an upper portion of one of the drive bands extending in an upper recess of a channel of one of the drive member protectors.
Figure 11A:
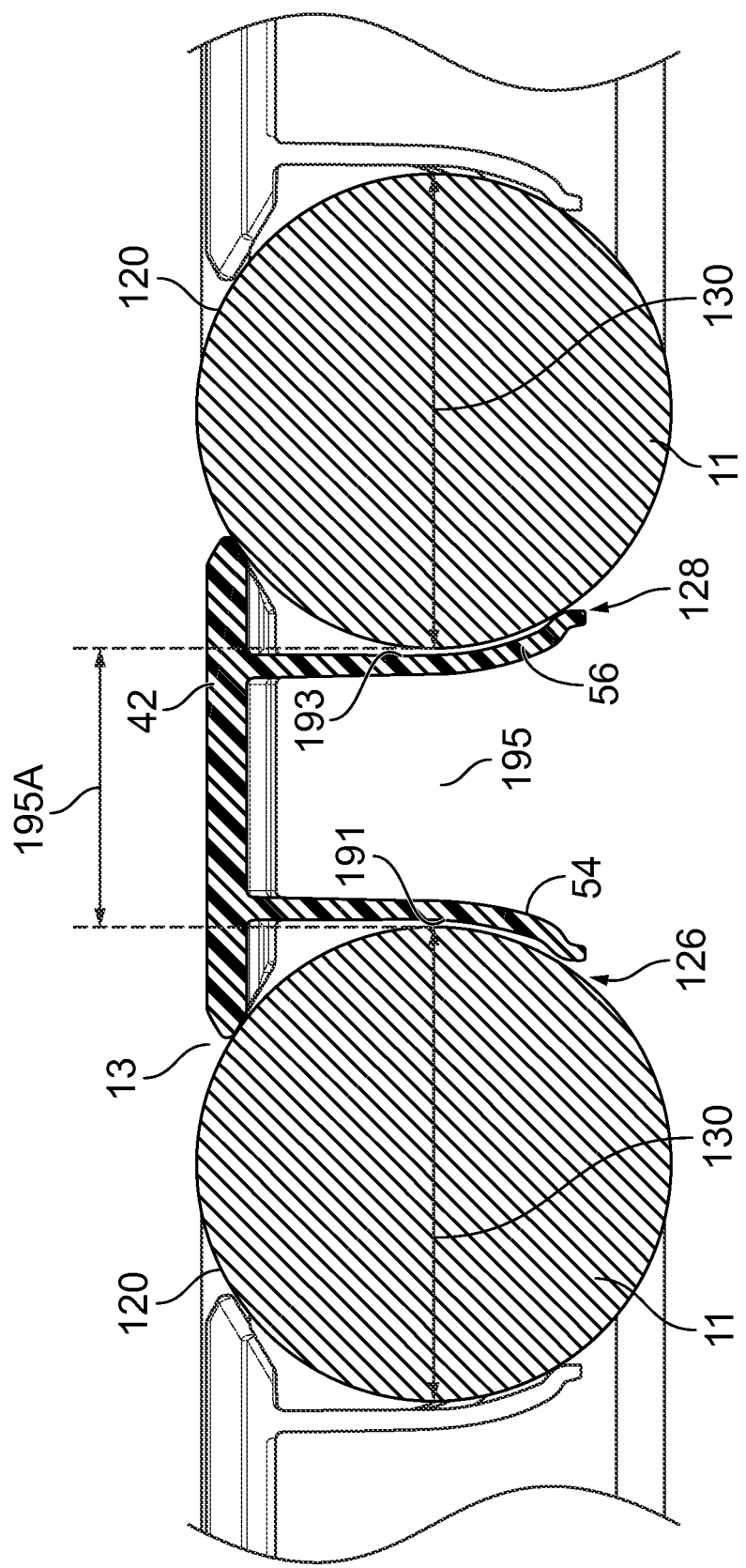
FIG. 11A is a cross-sectional view taken across line 11-11 in FIG. 1 showing the upper portion of the drive member protector positioned above the narrowest portion of the gap and lower contact portions of the side leg portions positioned below the narrowest portion of the gap.

With reference to FIG. 2, the drive member protector 40 has a body 50 that includes the upper portion 42 and a lower portion 52. The upper and lower portions 42, 52 cooperate to provide a snap-fit engagement with the rollers 11. The lower portion 52 includes two pairs of side leg portions 54, 56 and a pair of lower locating members, such as middle leg portions 60, 61. The middle leg portions 60 have protrusions, such as engagement portions 62, that engage surface portions of the groove 26 and limit side-to-side lateral movement of the drive member protector 40 relative to the rollers 11. The side leg portions 54, 56 are separated by a longitudinal space 90 and the pair of middle leg portions 60, 61 are separated by a longitudinal space 92. When the lower portion 52 is undeflected, the spaces 90, 92 each have a longitudinal distance thereacross that is sized to be greater than a minimum longitudinal dimension 195A (see FIG. 11A) of the gap 13 between the rollers 11.

In one embodiment, at least one of the middle leg portions 60, 61 and at least one of the side leg portions 54, 56 of each pair of side leg portions 54, 56 are resilient to permit the leg portions to be shifted from an initial, undeflected configuration to a resiliently deflected configuration which permits the leg portions 60, 61, 54, 56 to be advanced into the gap 13 between the rollers 11.

Figure 3:
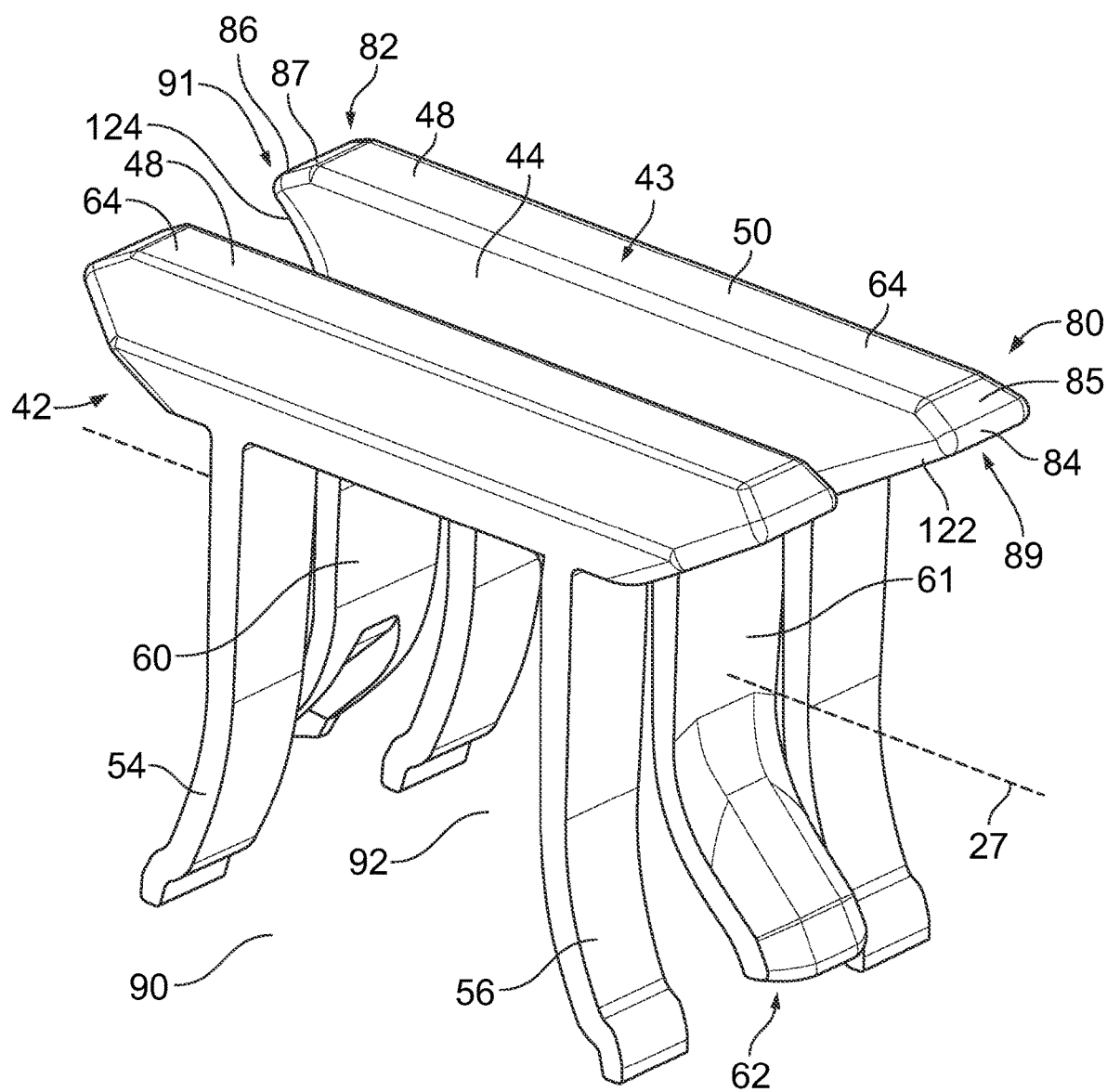
FIG. 3 is a perspective view of the drive member protector of FIG. 2 showing the upper portion of the drive member protector including the channel having raised portions on either side of the recess to extend along and protect the drive band upper portion and a lower portion of the drive member protector including resilient leg portions depending from the upper portion.
Figure 6:
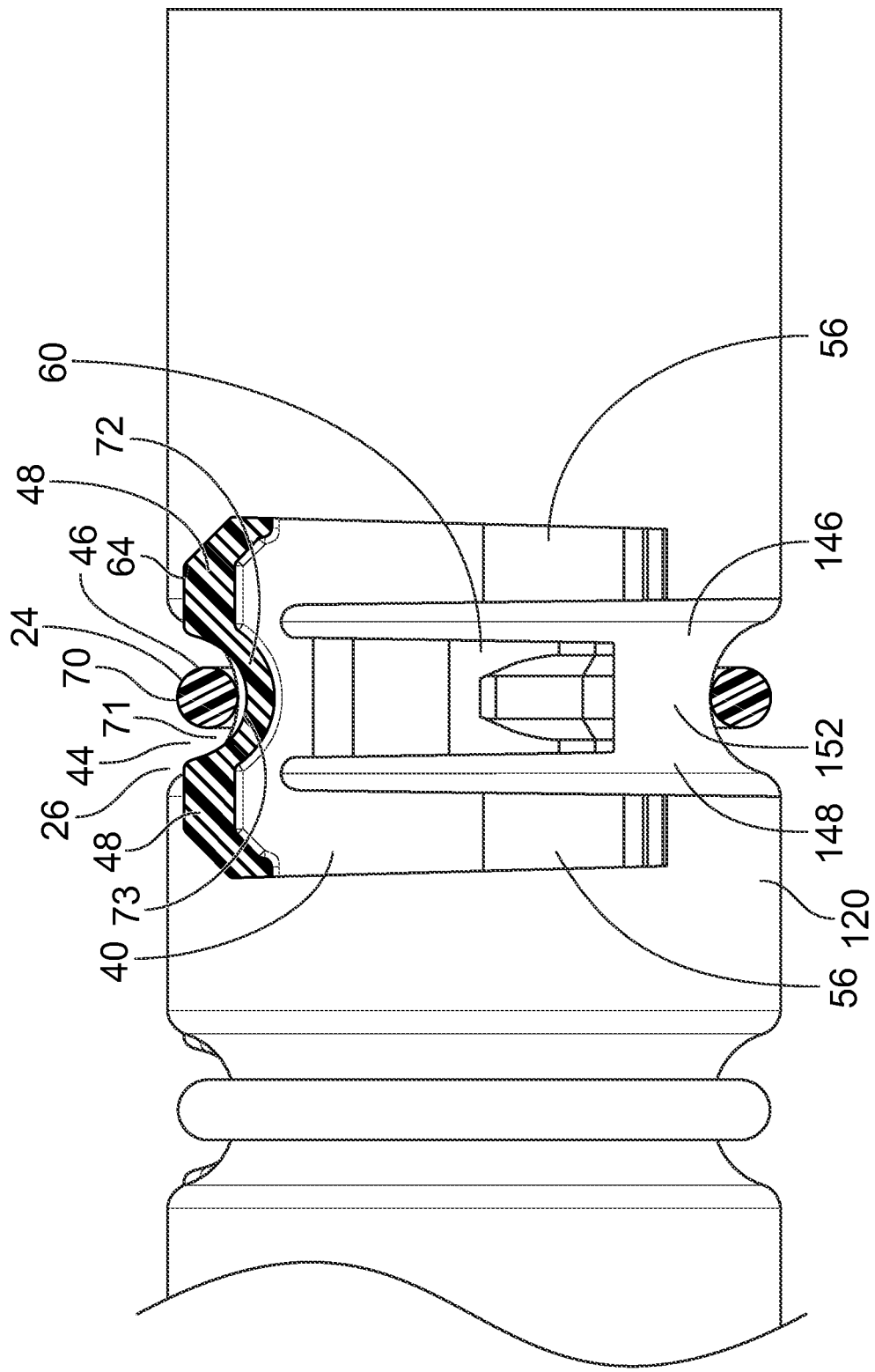
FIG. 6 is a cross-sectional view taken across line 6-6 in FIG. 1 showing upper surfaces of the raised portions of the drive member protector generally level with a top of the upper portion of the drive band to protect the drive band.

With reference to FIG. 3, the raised portions 48 include upper surfaces 64 that may be, for example, flat or have a plurality of projections such as ridges or localized bumps. As shown in FIG. 6, the channel 43 of the drive member protector 40 is sized so that with the drive member protector clipped onto the rollers 11 and the drive band 24 received in the channel 43, the upper surfaces 64 will be above, level with, or slightly below a top 70 of the upper portion 46 of the drive band 24. The raised portions 48 thereby extend on either side of the drive band 24 received in the recess 44 and protect the drive band 24 by absorbing contact from conveyed objects in vertical or horizontal directions as shown in FIG. 6. Further, the upper surfaces 64 extend longitudinally and may support an object that contacts the upper surfaces 64 as the object is conveyed in the downstream longitudinal direction 22 as the rollers 11 turn in rotary direction 20.

To form the channel 43 in the upper portion 42 of the drive member protector 40, the upper portion 42 includes an intermediate portion such as a downwardly curved concave wall 72 connecting the raised portions 48. The curved wall 72 has a bottom surface, such as upwardly facing surface or curved outer surface 73, that defines the recess 44 between the raised portions 48. The curved outer surface 73 operates as a clearance surface and provides a U-shaped space 71 for the upper portion 46 of the drive band 24 that is sized relative thereto such that the drive member protector 40 is in clearance with the drive member 24 to reduce frictional resistance of the drive member protector 40 to rotation of the rollers 11. As can be seen in FIG. 6, the drive member 24 can have a round or circular cross-section having a smaller radius than the radius of the curved outer surface 73.

With reference to FIG. 2, the raised portions 48 of the body 50 have upper contact portions 80, 82 that contact the cylindrical outer surface 120 (see FIG. 6) of the adjacent roller 11 on either side of the gap 13. Because the raised portions 48 extend longitudinally on either side of the drive band 24 where the drive band upper run 28 enters and exits the groove 28, the raised portions 48 obstruct the interfaces between the drive band upper run 28 and the roller 11 and inhibit articles of clothing or other objects from becoming caught between the drive band 24 and the rollers 11.

Figure 4:
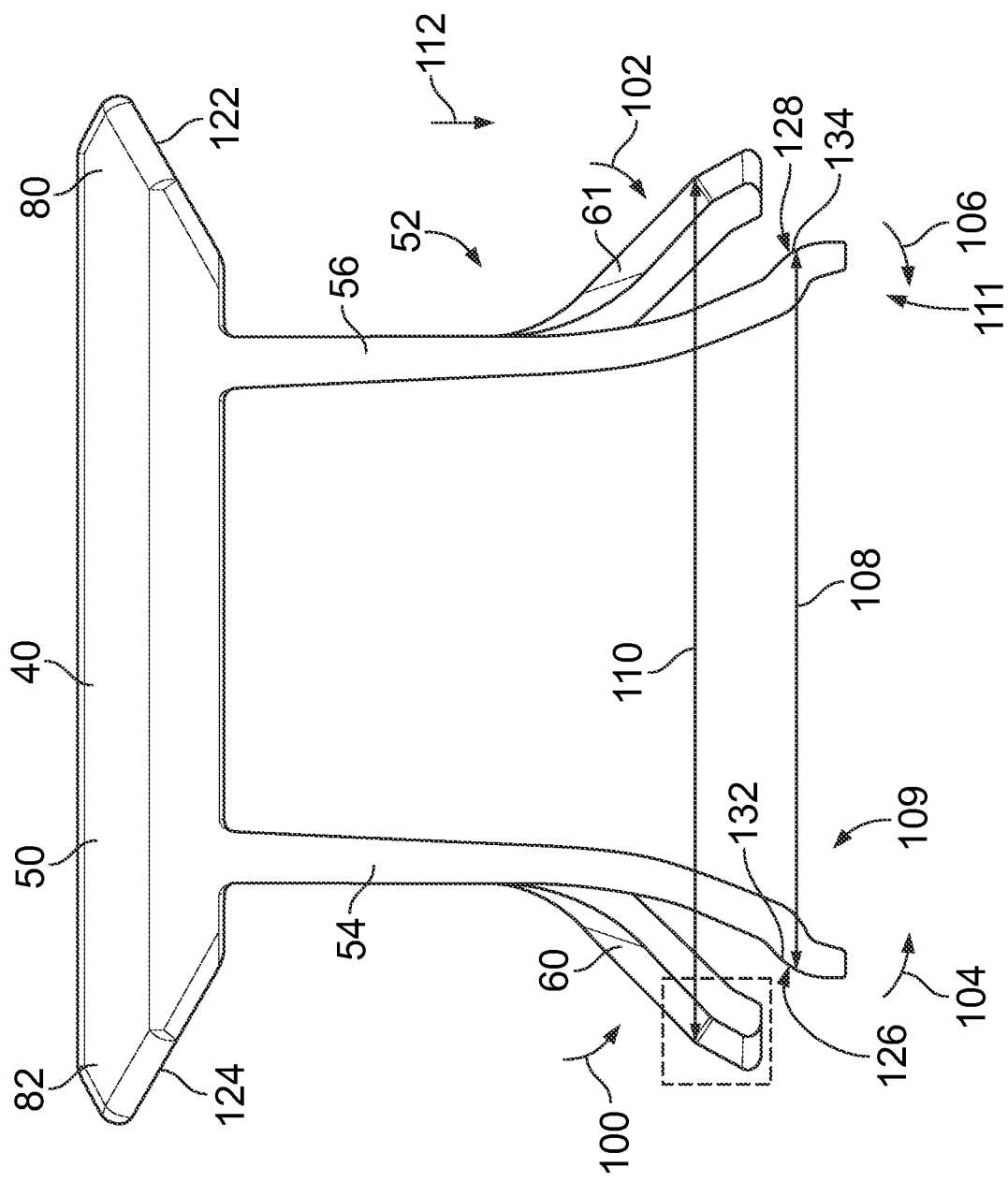
FIG. 4 is a side elevational view of the drive member protector of FIG. 3 showing middle leg portions extending longitudinally outward of side leg portions so that the middle leg portions are positioned to tightly engage in grooves of adjacent rollers whereas the side leg portions are positioned to be adjacent outer cylindrical surfaces of the rollers.

With respect to FIGS. 3 and 4, the upper contact portions 80, 82 have lower tapered surfaces 122, 124 that rest upon the cylindrical outer surfaces 120 of the rollers 11 such that the lowered tapered surfaces 122, 124 slidingly contact the cylindrical outer surfaces 120 as the rollers 11 rotate. The upper contact portions 80, 82 further include edges 84, 86 and upper tapered surfaces 85, 87 that provide a wedge shape of outboard ends 89, 91 of the contact portions 80, 82. The wedge shape of the outboard ends 89, 91 of the contact portions 80, 82 directs a conveyed object that contacts the outboard ends 89, 91 up onto the upper surfaces 48 for transfer across the gap 13.

The body 50 of the drive member protector 40 may have a unitary, one-piece construction such that the body 50 is made of the same material throughout. In some embodiments, the drive member protector 40 is made by injection molding or additive manufacturing using a polymer material. In other embodiments, the body 50 may be made a plurality of materials, such as a substrate made of a first material, such as ultra high molecular weight (UHMW) polyethylene, that provides overall shape of the drive protector 40 and a second material, such as polytetrafluoroethylene, at the portions of the drive member protector 40 that contact the rollers 11. The second material may be a material that provides improved durability and/or a lower coefficient of friction against the rollers than the first material. In some approaches, the body 50 may be made of mechanically connected components, such as components attached by fasteners and/or interlocking structures of the components.

With reference to FIG. 4, the side leg portions 54, 56 and the middle leg portions 60, 61 have an initial undeflected configuration. The lower portion 52 has an installation configuration wherein the at least one of the middle leg portions 60, 61 are shifted toward the other middle leg portion 60, 61 relative to the upper portion 42 to decrease a distance 110 between the groove engaging portions 62 of the middle leg portions 60, 61. For example, both middle leg portions 60, 61 may be shifted toward each other if both middle leg portions 60, 61 are resilient or only one of the middle leg portions 60, 61 may be shifted toward the other middle leg portion 60, 61 such as if the other middle leg portion 60, 61 is rigid. In the installation configuration, the distance 110 between the groove engaging portions 62 is less than a distance between the minimum outer diameter of the grooves at the narrowest portion of the gaps 13 between the rollers 11.

The installation configuration of the lower portion 52 likewise includes at least one of the side leg portions 54, 56 shifted toward the other side leg portion 54, 56 relative to the upper portion 42 to decrease a distance 108 between the contact portions 126, 128 of the side leg portions 54, 56. For example, both side leg portions 54, 56 may be shifted together if both side leg portions 54, 56 are resilient or only one of the side leg portions 54, 56 may be shifted toward the other side leg portion 54, 56 such as if the other side leg portion 54, 56 is rigid. In the installation configuration, distance 108 between the contact portions 126, 128 is less than a distance between the cylindrical outer surfaces 120 of the rollers 11 at the narrowest portion of the gap 13 between the rollers 11.

With the middle leg portions 60, 61 urged toward one another and the side leg portions 54, 56 urged toward one another, the lower portion 52 is in the installation configuration and is sized to be advanced into the gap 13 generally in direction 112. The drive member protector 40 may be advanced straight into the gap 13. In another approach, the side leg portions (e.g., side leg portions 56) and the middle leg portion (e.g. middle leg portion 61) of one longitudinal side (e.g., longitudinal side 111) of the drive member protector 40 is positioned against one roller 11, then the side leg portions (e.g., side leg portions 54) and the middle leg portion (e.g., middle leg portion 60) of the other longitudinal side 109 are deflected toward the other leg portions and the drive member protector is rocked to advance the side leg portions 54 and middle leg portion 60 below the narrowest portion of the gap 13.

With regard to FIG. 4, the groove engaging portions 62 of the middle leg portions 60, 61 slidingly contact the side surface portions 146, 148 (see FIG. 6) of the grooves 26 of the rollers 11 and the contact portions 80, 82 slidingly contact the cylindrical outer surfaces 120 of the rollers 11 above the narrowest portion of the gap 13 on either side of the grooves 26. The side leg portions 54, 56 each have contact portions 126, 128 that are configured to be positioned below the narrowest portion of the gap 13. For example, the gap 13 may have a narrowest portion 195 defined between aligned outer diameters or equators 130 (see FIG. 11A) of the rollers 11. The contact portions 126, 128 may include protrusions that extend toward the rollers 11 and have surfaces configured to form a minimum contact area with the cylindrical outer surfaces 120, such as a point contact or a line contact that extends laterally across the cylindrical outer surfaces 120. As one example, the contact portions 126, 128 have convex surface portions 132, 134. In one embodiment, the contact portions 126, 128 are in clearance with the rollers 11 such as having a running fit with the cylindrical outer surfaces 120 of the rollers 11. In other examples, one of the side leg portions 54, 56 is configured to clash with one of the rollers 11 such that the one side leg portions 54, 56 is deflected when the drive member protector 40 is positioned in the gap 13.

Figure 11B:
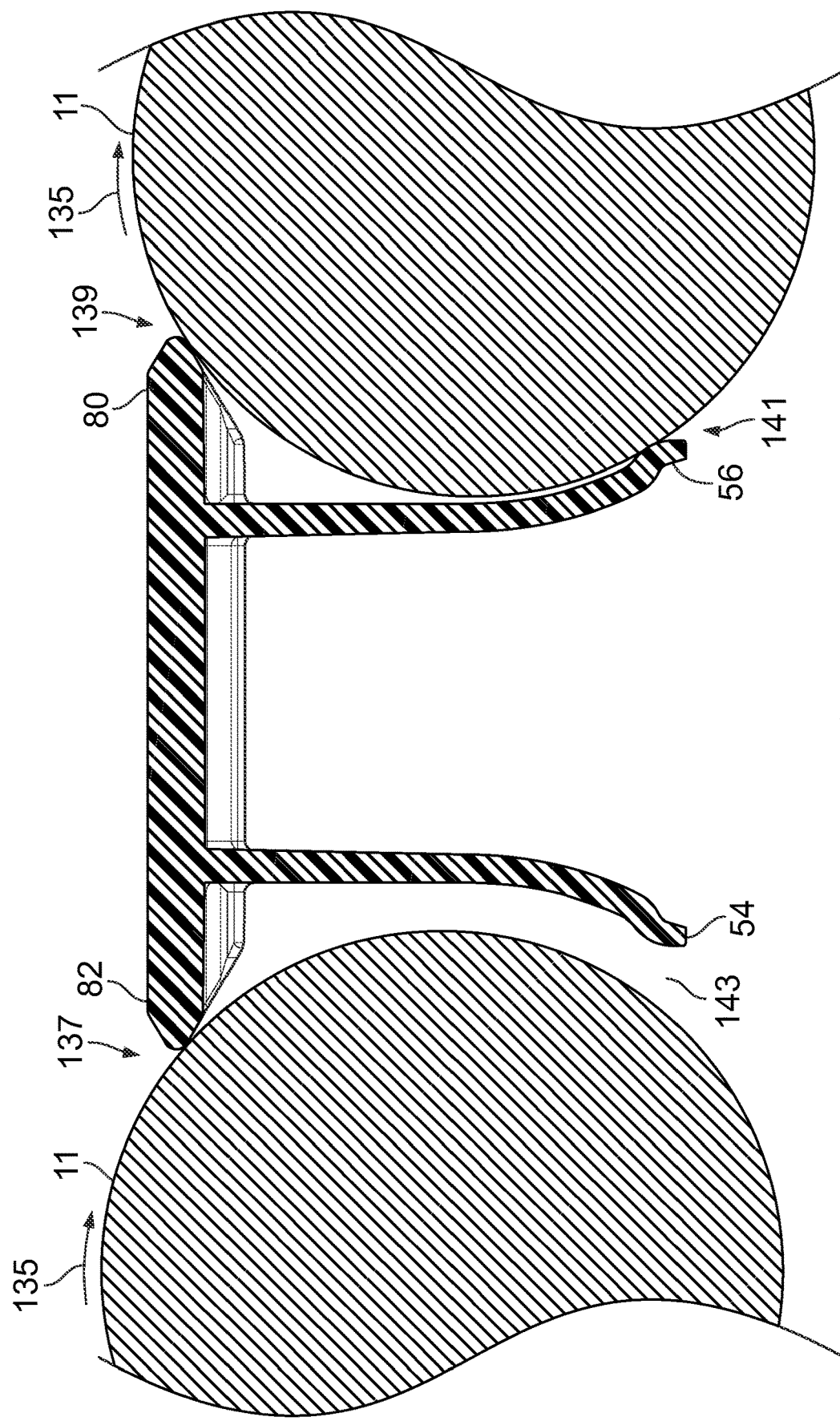
FIG. 11B is a cross-sectional view similar to FIG. 11A showing the orientation of the drive member protector during operation of the roller conveyor.
Figure 12:
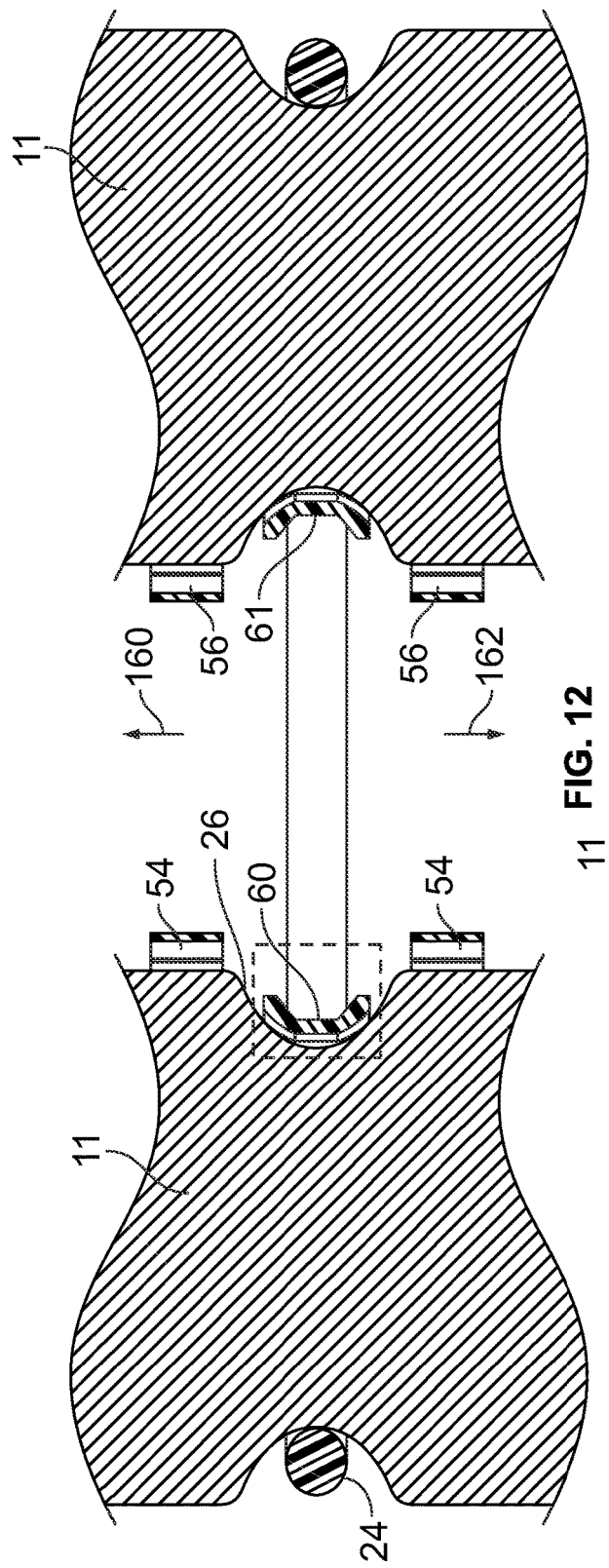
FIG. 12 is a cross-sectional view taken across line 12-12 in FIG. 1 showing the middle leg portions engaging the grooves of the rollers and the contact portions of the side leg portions spaced laterally from the grooves and proximate the cylindrical outer surface of the rollers.

With reference to FIG. 11B, the drive member protector 40 is shown in a steady-state orientation when the rollers 11 are rotating in rotary direction 135. The position of the drive member protector 40 shown in FIG. 11B is understood to be representative of its general location during operation of the roller conveyor 12 understanding that there will usually be some slight shifting or vibratory-like movement of the drive member protector 40 as the rollers 11 rotate and convey objects thereon. The upper contact portions 80, 82 and the downstream side leg portions 56 slidingly contact the rollers 11 at respective interfaces 137, 139, 141 therebetween. The upstream side leg portions 54 are spaced by gaps 143 from the upstream roller 11. The gaps 143 between the upstream roller 11 and the upstream side leg portions 54 reduces the frictional resistance the drive member protector 40 applies to the rollers 11. The drive member protector 40 may occasionally unsettle from the steady state orientation of FIG. 11B, such as due to an impact against one of the rollers 11, which results in the upstream side leg portions 54 temporarily contacting the upstream roller 11 and the downstream side leg portions 56 becoming spaced from the downstream roller 11. The sliding contact between the upper contact portions 82, 80 and the upstream and downstream rollers 11, respectively, and the rotation of the rollers 11 in rotary direction 135 generally urges the upper contact portion 82 downward and the upper contact portion 80 upwardly to tilt the drive member protector 40 back toward the steady-state orientation of FIG. 11B with the upstream side leg portions 54 spaced from the upstream roller 11 and the downstream side leg portions 56 in sliding contact with the downstream roller 11.

Figure 5:
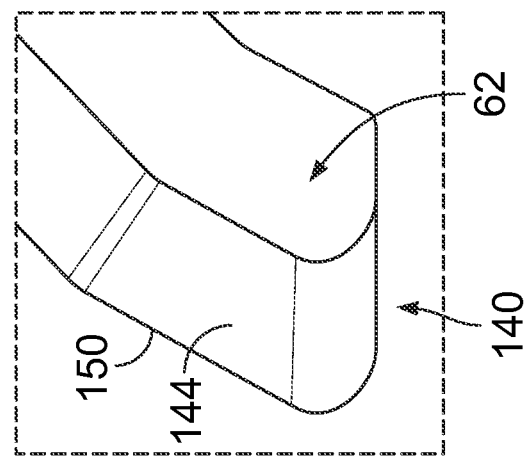
FIG. 5 is an enlarged view of the dashed square portion of FIG. 4 to show a groove engaging portion of the middle legs that engage side surfaces of the associated groove and limit side-to-side lateral movement of the drive member protector.
Figure 7:
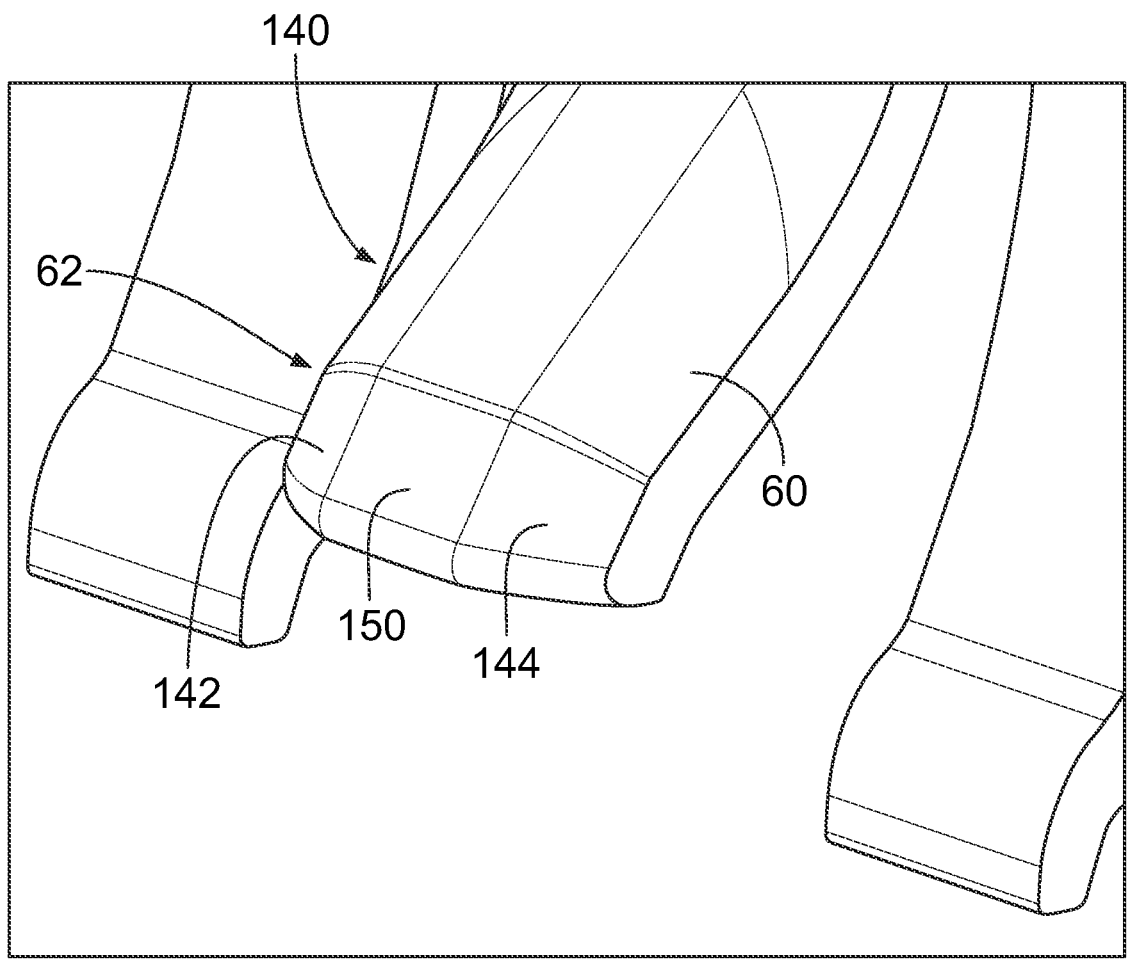
FIG. 7 is an enlarged, perspective view of the groove engaging portion of one of the middle legs of the drive member protector showing convex side surface portions that engage side surface portions of the groove and a concave middle surface portion that is in clearance with the groove.
Figure 13:
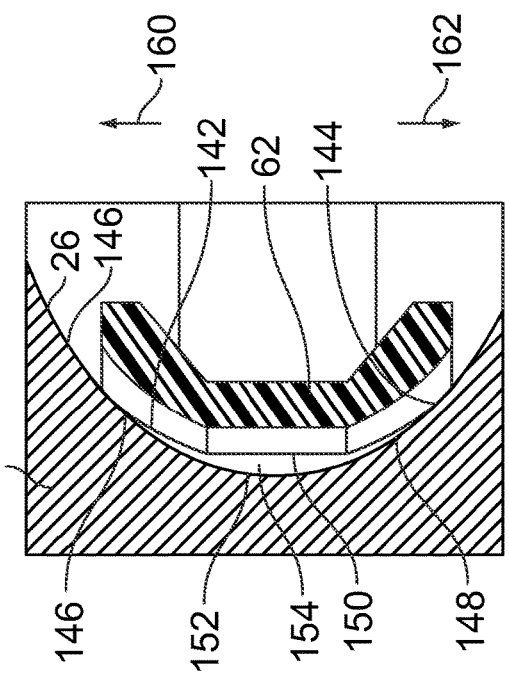
FIG. 13 is an enlarged view of the dashed square portion of FIG. 12 showing the side surface portions of the middle leg portion engaging side surface portions of the groove and the middle surface portion in clearance with a central recessed surface portion of the groove that includes the groove minimum outer diameter.

With reference to FIG. 7, the middle leg portions 60, 61 each have the groove engaging portion 62 at a free end portion 140 thereof. The groove engaging portion 62 includes side surface portions 142, 144 that have a convex shape for engaging side surface portions 146, 148 (see FIG. 13) of the groove 26. With references to FIGS. 5 and 7, the groove engaging portion 62 also includes a middle surface portion 150 that has a concave shape so that the middle surface portion 150 is in clearance with a radially inner or central recessed surface portion 152 (see FIG. 13) of the groove 26 by a radial gap 154. The engaged side surface portions 142, 144 of the middle leg portions 60, 61 and the side surface portions 146, 148 of the groove 26 inhibit movement of the drive member protector 40 in lateral directions 160, 162. In this manner, the engagement between the middle leg portions 60, 61 and the grooves 26 of adjacent rollers 11 keeps the drive member protector 40 in position along the rollers 11 so that the upper portion 46 of the drive band 24 travels through the recess 44 during operation of the roller conveyor 10.

Figure 8:
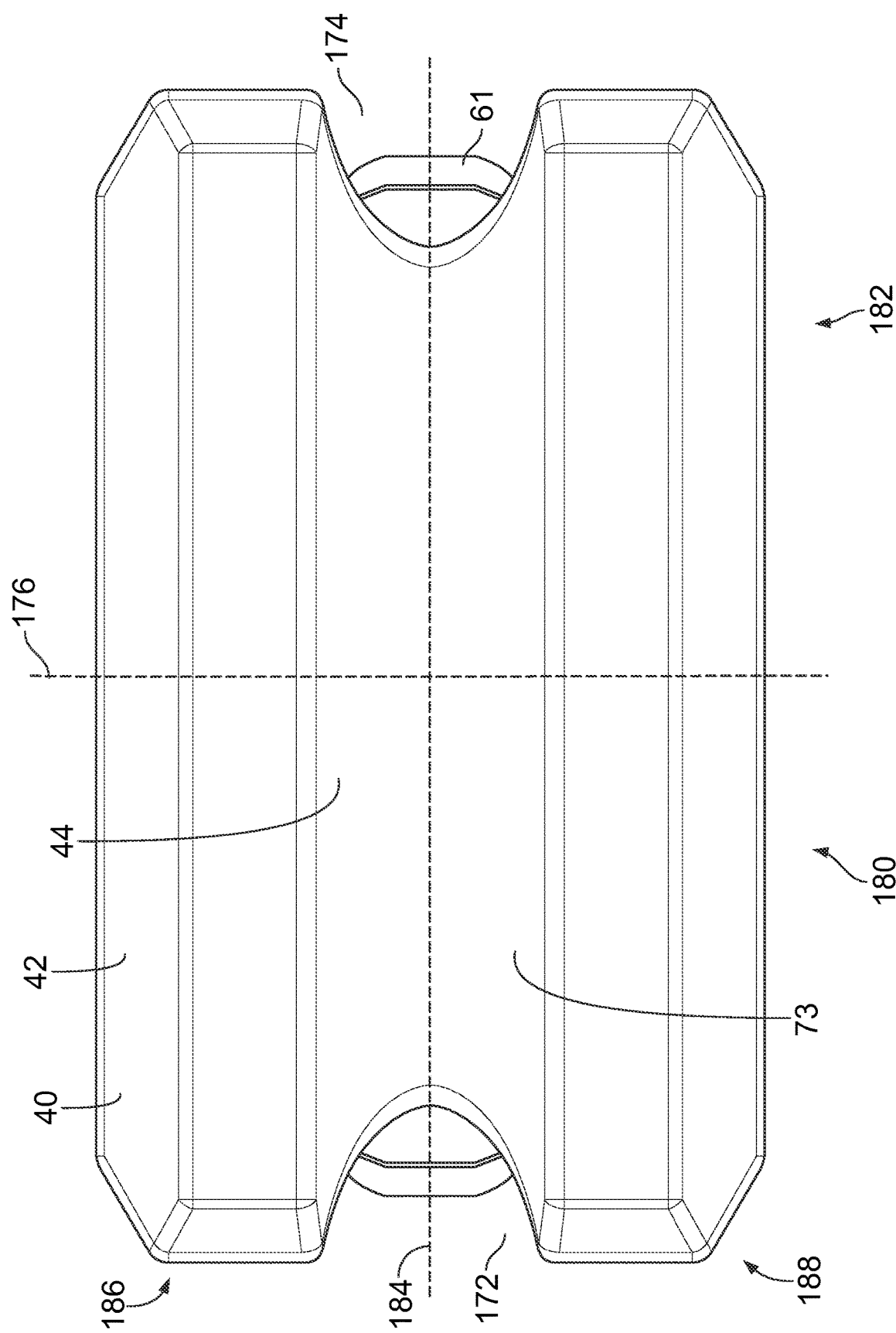
FIG. 8 is a top plan view of the drive member protector of FIG. 3 showing entry and exit openings at either end of the recess of the channel of the drive member protector that provide clearance for the drive band to travel into and out from the channel of the drive member protector.

With reference to FIG. 8, the upper portion 42 of the drive member protector 40 includes openings 172, 174 that provide clearance for the drive band 24 to enter and exit the recess 44. In one embodiment, the drive member protector 40 has a laterally extending axis of symmetry 176 whereby the drive member protector has longitudinal halves 180, 182 that are mirror images of one another about the axis of symmetry 176. The symmetry of the drive member protector 40 about the lateral axis of symmetry 176 permits the drive member protector 40 to be installed with either longitudinal halves 180, 182 positioned against an upstream or downstream roller 11. Similarly, the drive member protector 40 has a longitudinal axis of symmetry 184 such that lateral halves 186, 188 of the drive member protector 40 are symmetrical about the longitudinal axis of symmetry 184. In some embodiments, the symmetry of the drive member protector 40 about the longitudinal axis of symmetry 184 provides balanced loading on the drive member protector 40 from the rollers 11. In other embodiments, the drive member protector 40 may be asymmetrical about longitudinal and/or lateral axes.

Figure 9:
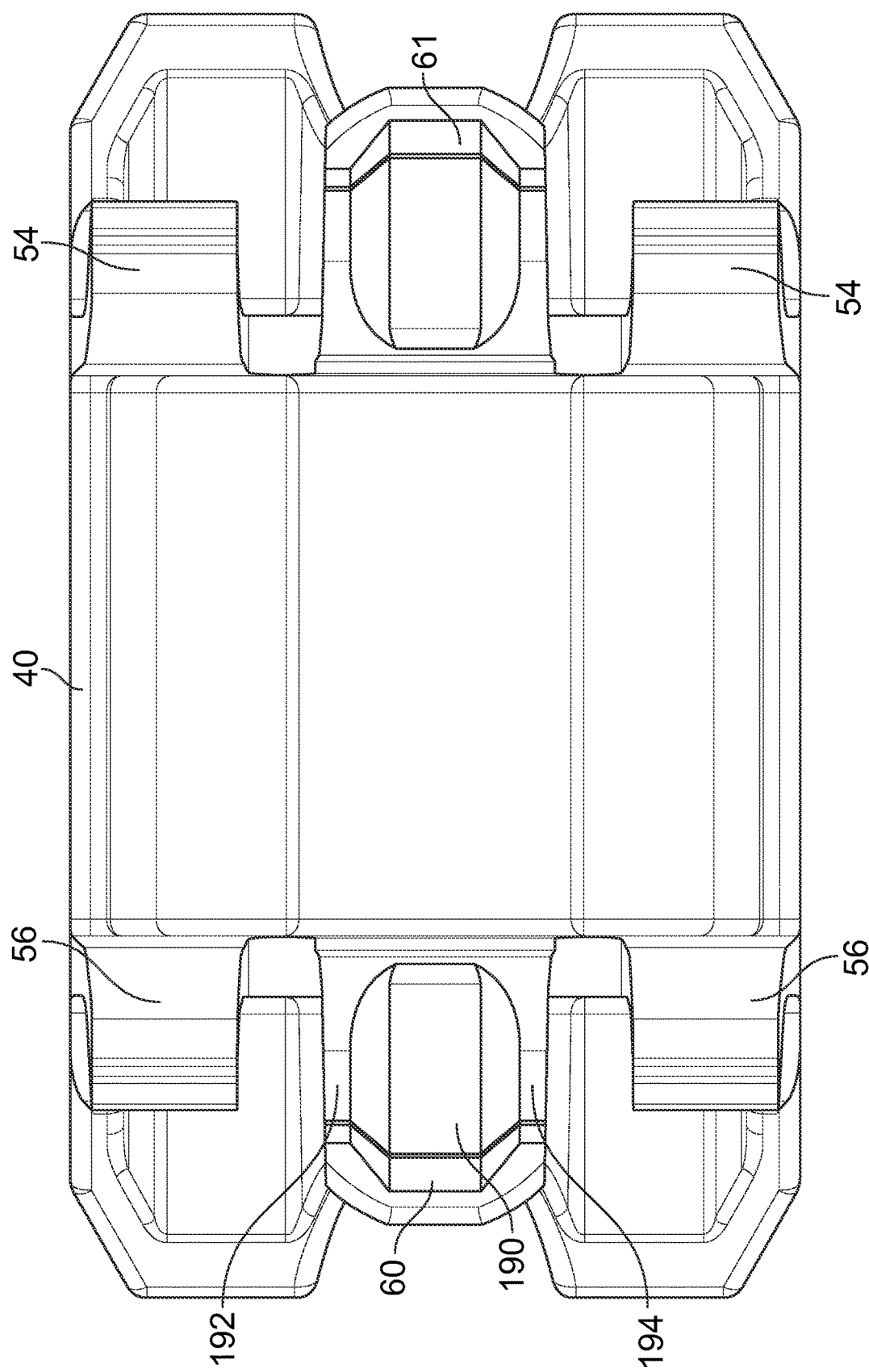
FIG. 9 is a bottom view of the drive member protector of FIG. 3 showing recesses of undersides of the middle leg portions.

With reference to FIG. 9, the middle leg portions 60, 61 each have a recess 190 in an underside thereof with walls 192, 194 on opposite sides of the recess 190. The recess 190 may help provide a substantially uniform wall thickness of the middle leg portions 60, 61 while permitting the groove engagement portions 62 to contact a majority of the radial extent of the side surface portions 146, 148 of the groove 26.

Figure 10:
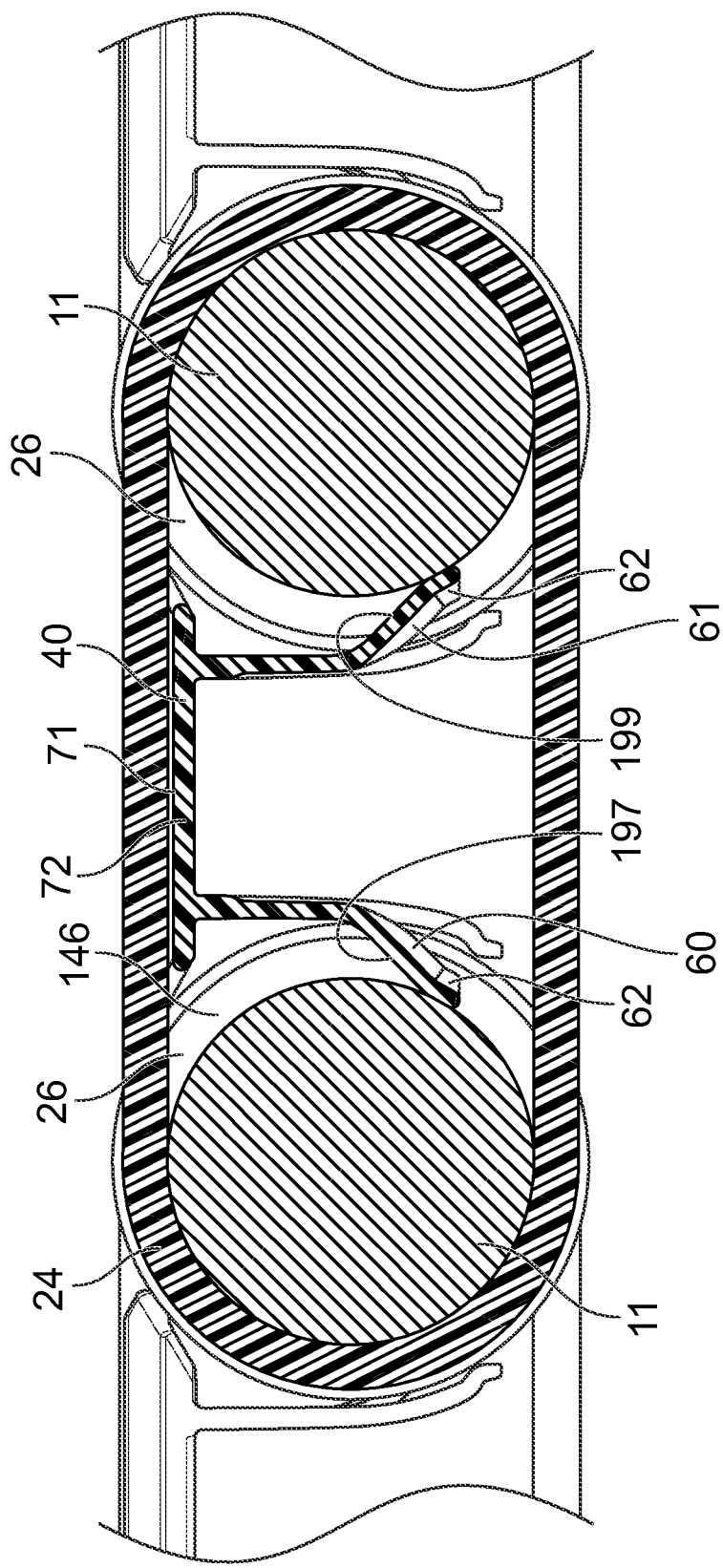
FIG. 10 is a cross-sectional view taken across line 10-10 in FIG. 1 showing the middle leg portions of the drive member protector engaged in the grooves of the adjacent rollers.

Turning to FIG. 10, the middle leg portions 60, 61 are shown with the groove engaging portions 62 thereof in register with the grooves 26 of the rollers 11. The middle leg portions 60, 61 have clearance surface portions 197, 199 facing the grooves 26 that are configured to be in clearance with the rollers 11. While the groove engaging portions 62 make contact with the rollers 11 to resist lateral movement, twisting of the drive member protector 40 around a longitudinal axis 27 (see FIG. 3), and/or upward movement of the drive member protector 40, the clearance surface portions 197, 199 are spaced from the rollers 11 to limit frictional resistance of the middle leg portions 60, 61 to rotation of the rollers 11.

With reference to FIG. 11, the side leg portions 54, 56 have clearance surfaces 191, 193 facing the rollers 11 that are configured to be in clearance with the rollers 11. The clearance surface portions 191, 193 avoid contact between the side leg portions 54, 56 and the rollers 11 which reduces resistance of the leg portions 54, 56 to rotation of the rollers 11 which improves sufficiency of the roller conveyor 10. Further, the contact portions 126, 128 of the leg portions 54, 56 are positioned to contact the cylindrical outer surfaces 120 of the rollers 11 and resist upward movement of the drive member protector 40 such as if a corner of a box strikes the drive member protector 40. In one embodiment, the clearance surface portions 191, 193 of the leg portions 54, 56 extend from the contact portions 126, 128 of the side leg portions 54, 56 to the upper portion 42.

Figure 14:
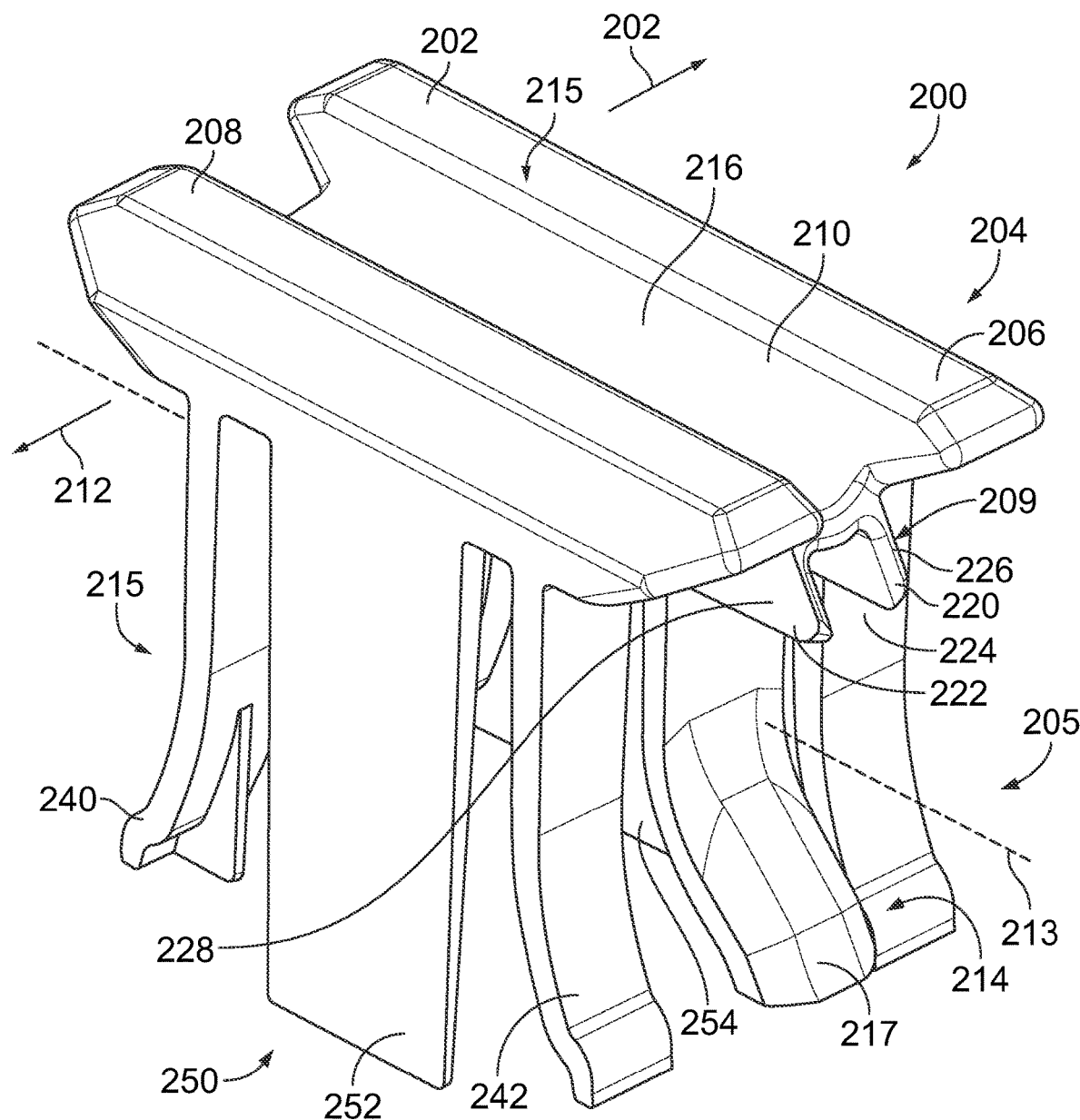
FIG. 14 is a perspective view of another drive member protector having a pair of upper spaced walls to engage in a groove of a roller above the narrowest portion of the gap between the roller and an adjacent roller and a middle leg portion to engage the roller below the narrowest portion of the gap.

With reference to FIG. 14, a drive member protector 200 is provided that is similar in many respects to the drive member protector 40 discussed above such that differences will be highlighted. The drive member protector 200 includes a body 202 having an upper portion 204 with a channel 215 that defines a recess 210. The channel 215 receives the upper portion 26 of the drive band 24. The upper portion 204 has raised portions 206, 208 extending along either side of the drive member 24 to protect the drive band upper portion 26.

The upper portion 204 also includes upper locating members 209 that are configured to be in register with the grooves 26 of adjacent rollers 11. The drive member protector 204 has a lower portion 205 that includes lower locating members 214 of the drive member protector 200, such as middle leg portions 215, 217, that are also configured to be in register with the grooves 26 of the adjacent rollers 11. The upper locating members 209 engage in the grooves 26 above the narrowest portion of the gap 13 and the lower alignment members 214 engage in the grooves 26 below the narrowest portion of the gap 13. The engagement between the upper and lower locating members 209, 214 and the grooves 26 of the rollers 11 inhibits lateral movement in directions 210, 212, upward movement of the drive member protector 200 out of the gap 13, and/or twisting of the drive member protector 200 around a longitudinal axis 213 once the drive member protector 200 is installed in the gap 13. In this manner, the upper and lower locating members 209, 214 keep the recess 210 of the drive member protector 200 longitudinally aligned with the grooves 46 of the rollers 11 and keeps a curved surface 216 of the upper portion 204 in clearance with the drive band 24.

Figure 15:
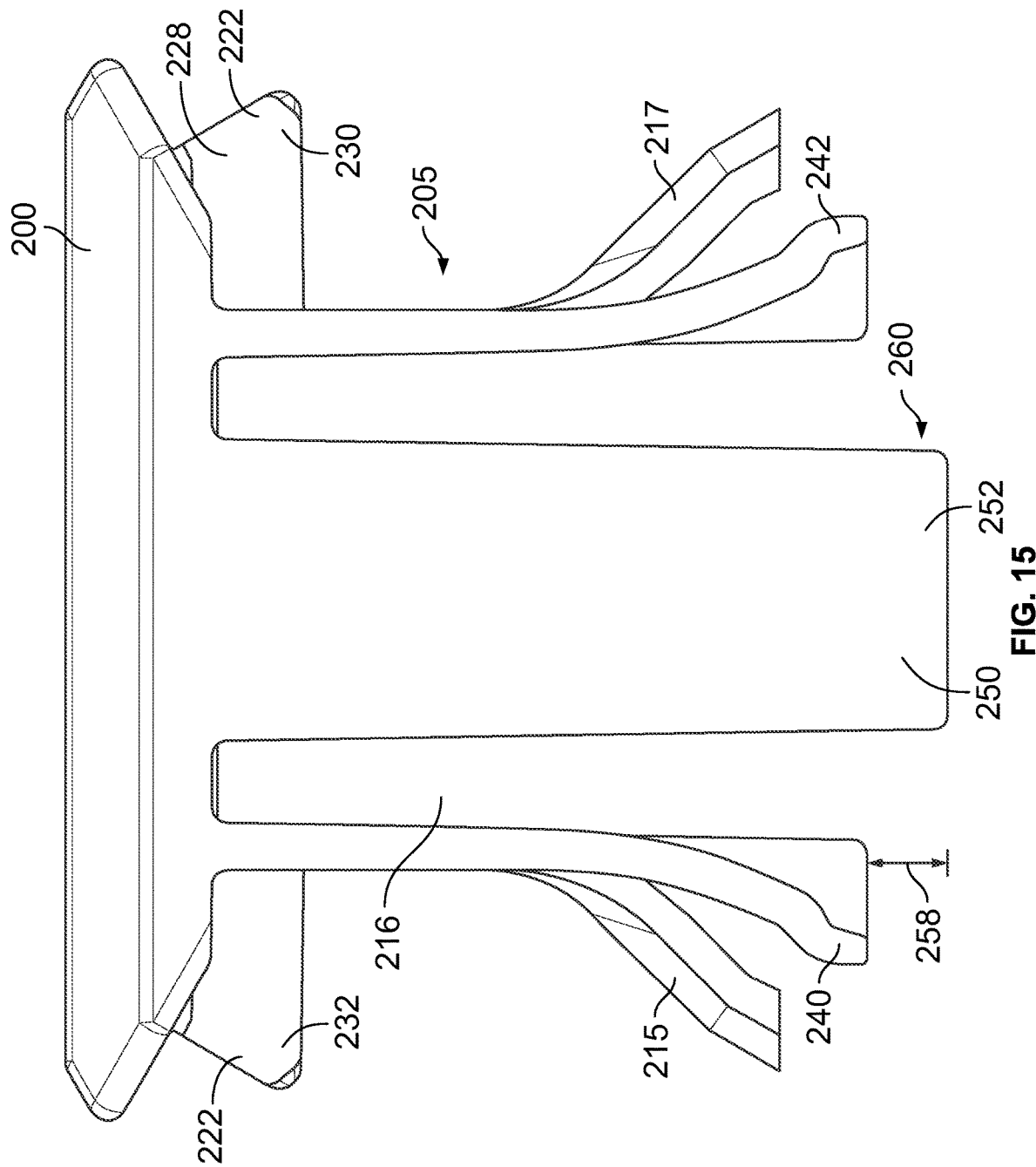
FIG. 15 is a side elevational view of the drive member protector of FIG. 14 showing a side plate of the drive member protector that extends downward within the gap to have an end portion level with a lower portion of a drive band extending across the gap to protect the drive band lower portion.

In one embodiment, the upper locating members 209 each include a pair of walls 220, 222 having a lateral spacing 224 therebetween. The walls 220, 222 have side surface portions 226, 228 configured to engage the side surface portions 146, 148 (see FIG. 6) of the grooves 26. With reference to FIGS. 14 and 15, the walls 220, 222 have end portions 230, 232 that are configured to be positioned on either side of the central recessed surface portion 152 (see FIG. 13) of the groove 26. The lateral spacing 224 between the walls 220, 222 provides a spacing of the upper locating members 209 at the central recessed surface portion 152 of the groove 26 such that the upper locating members 209 are in clearance with the central recessed surface portion 152 of the grooves 26 which reduces contact between the drive member protector 40 and the rollers 11.

Regarding FIG. 15, the lower portion 205 of the body 202 includes pairs of the side leg portions 240, 242. The body 202 also includes one or more protector members 250 such as walls 252, 254 depend from the upper portion 204 of the body 202. The walls 252, 254 have lower ends 256 a distance 258 below the side leg portions 240, 242.

Figure 16:
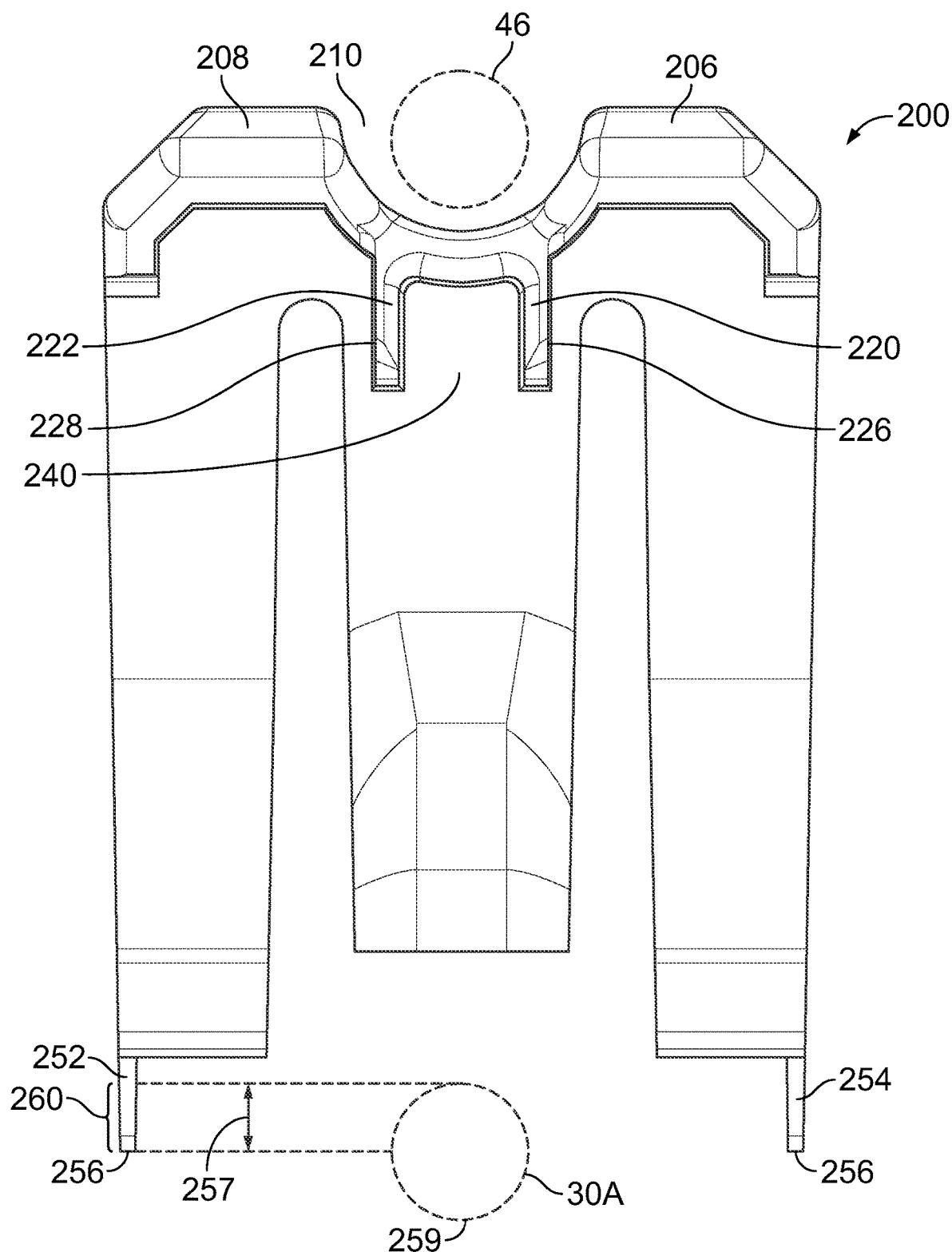
FIG. 16 is an end elevational view of the drive member protector of FIG. 14 showing the upper spaced apart walls of the drive member protector having side surfaces to engage side surface portions of the groove and limit side-to-side lateral movement of the drive member protector.

With reference to FIGS. 15 and 16, the walls 252, 254 have lower end portions 260 configured to extend longitudinally along a portion 30A of the lower run 30 of the drive band 24 when the drive member protector 200 is installed in a gap 13. Further, the lower end portions 260 of the walls 252, 254 are configured to overlap the portion 30A of the drive band 24 a vertical distance 257. The lower end portions 260 of the walls 252, 254 are positioned to protect the portion 30A of the lower run 30 of the drive band 24 from contact with objects or personnel below the roller conveyor 10. The lower ends 256 of the walls 252, 254 may be above, level with, or below a bottom 259 of the portion 30A of the lower run 30 of the drive band 24. In this manner, the drive member protector 200 has raised portions 206, 208 to protect the upper run 28 of the drive band 24 and the walls 252, 254 to protect the lower run 230 of the drive band 24.

Figure 17:
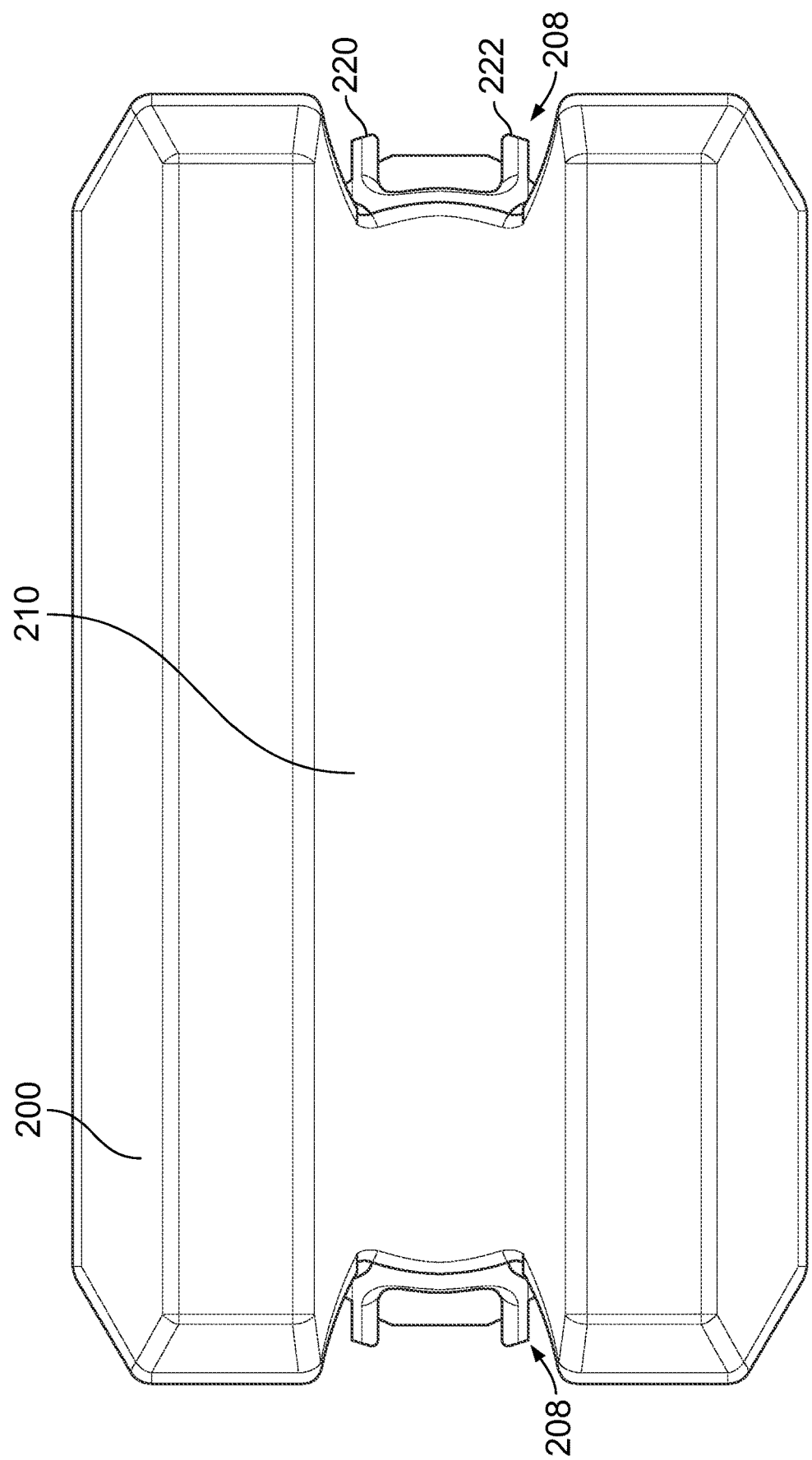
FIG. 17 is a top plan view of the drive member protector of FIG. 14 showing the upper pair of walls aligned with a recess of a channel of the drive member protector so that the upper pair of walls extend into the groove below the upper portion of the drive member.

Regarding FIG. 17, the walls 220, 222 of the upper locating members 209 are longitudinally aligned with the recess 210 so that the walls 220, 222 fit into the groove 26 of the rollers 11 that receive the drive band 24 extending in the recess 210.

Figure 18:
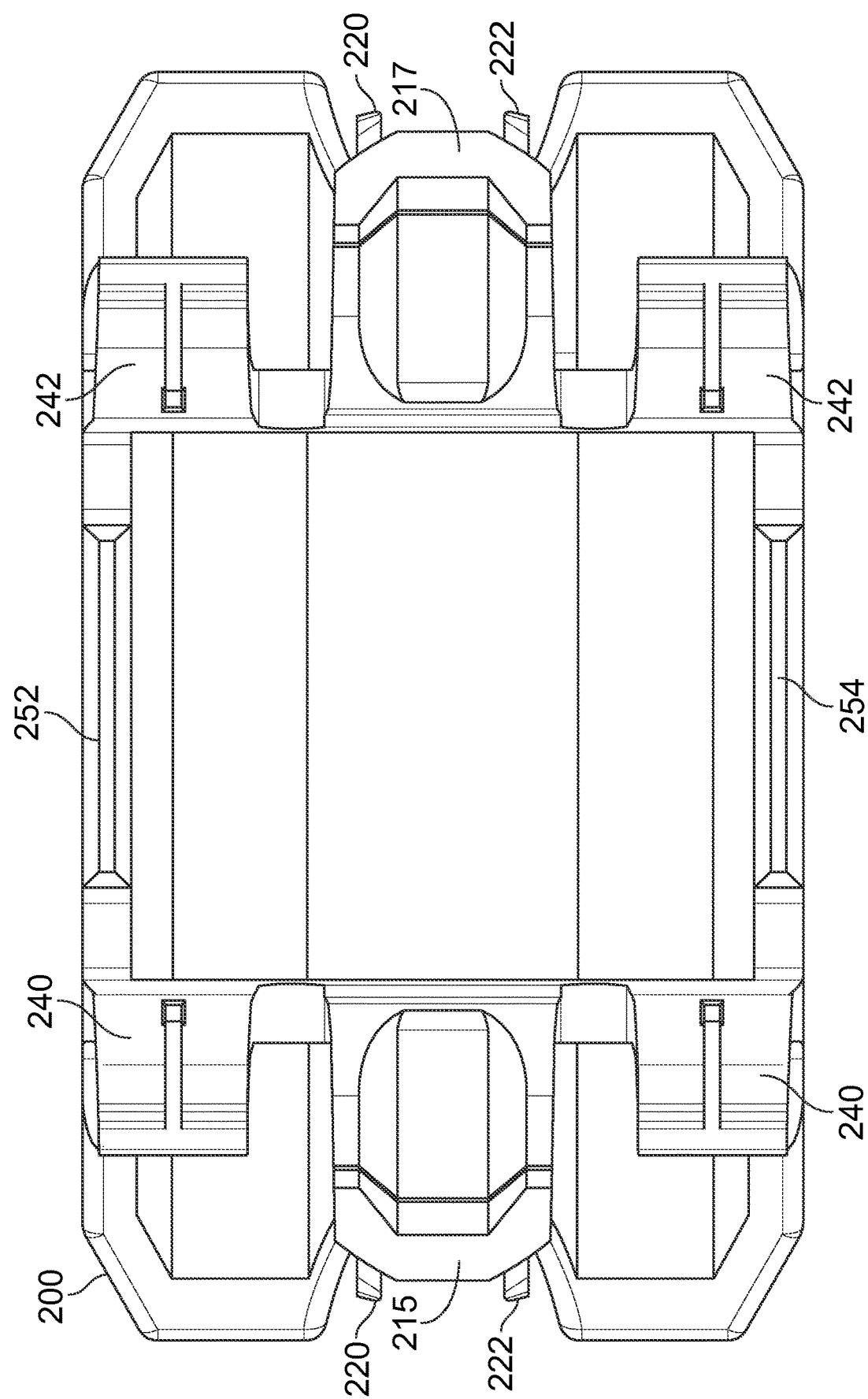
FIG. 18 is a bottom plan view of the drive member protector of FIG. 14 showing the side plates of the drive member protector on opposite lateral sides of a center portion of the drive member protector.

Regarding FIG. 18, the walls 220, 222 may project longitudinally outward of the middle leg portions 215, 217. The relative extent of the walls 220, 222 and middle leg portions 215, 217 may be selected to a particular application.

Figure 19:
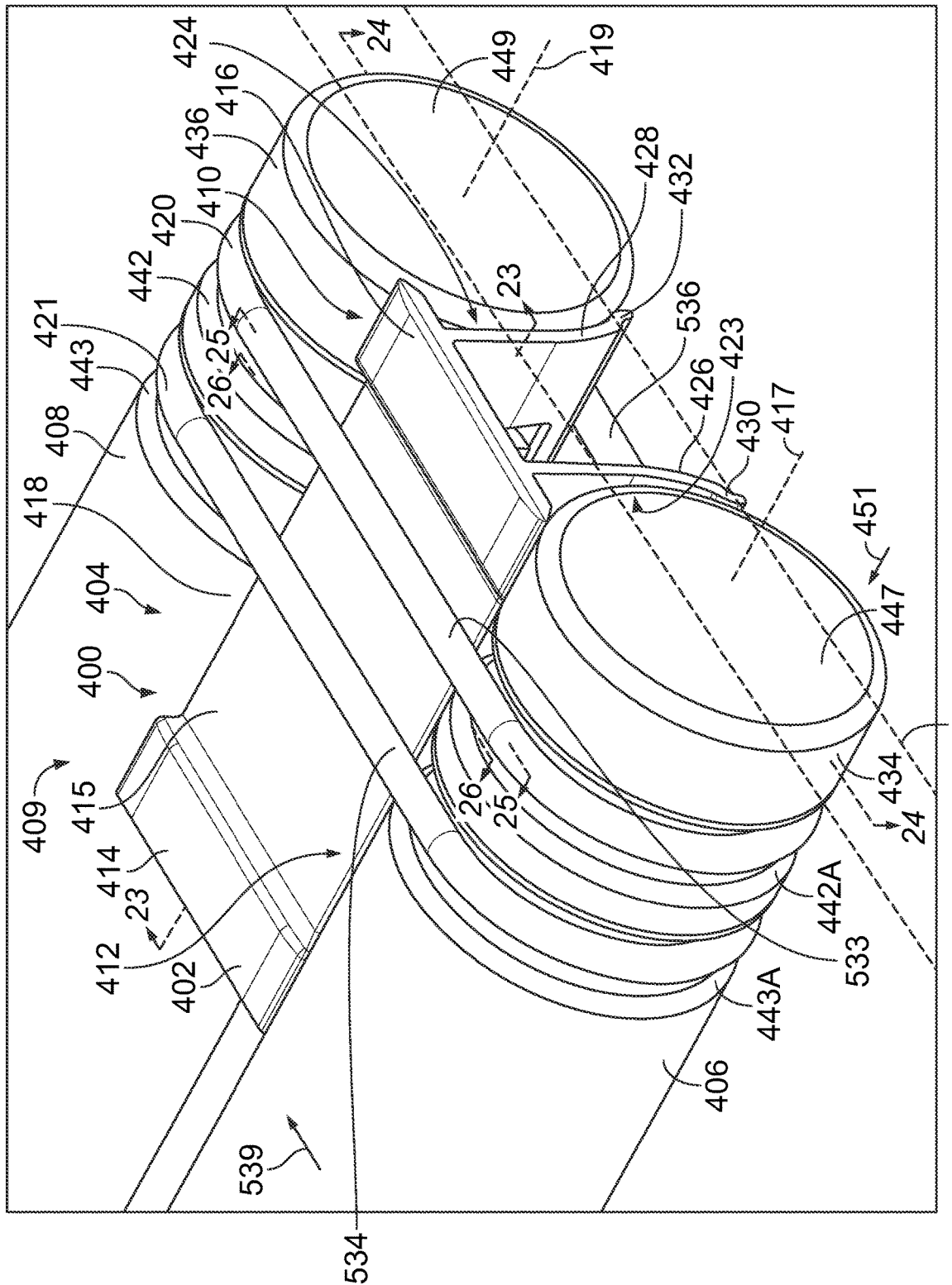
FIG. 19 is a perspective view of another drive member protector installed in a gap between rollers with two drive bands of the rollers extending in a wide channel having a wide recess in an upper portion of the drive member protector.

With reference to FIG. 19, a drive member protector 400 is provided that is similar in many respects to the drive member protectors discussed above. The drive member protector 400 has a wide body 402 configured to be positioned in a gap 404 between rollers 406, 408 of a conveyor system 409. The rollers 406, 408 are connected via drive bands 420, 421 and are rotatable around stationary axes 417, 419. The rollers 406, 408 are rotatably mounted to a stationary conveyor frame 413 mounted to, for example, a factory floor. The rollers 406, 408 may rotate to convey an object while the axes 417, 419 are fixed relative to the conveyor frame 413 and remain stationary.

The body 402 includes an upper portion 410 having an upper clearance portion 412, raised portions 414, 416 on either side of the upper clearance portion 412. The upper clearance portion 412 is in the form of a wide channel 415 having a wide recess 418 in and through which both of the drive bands 420, 421 extend. This is in contrast to the previously-described drive member protector 43 having the channel 43 sized to receive a single drive band 24. The wide channel 415 has a longitudinal length of the channel extending along the upper runs of the drive bands 420, 421 and a lateral width perpendicular to the longitudinal length that is larger than the longitudinal width to accommodate the positioning and movement of both drive bands 420, 421 in the wide channel 415. The upper portion 410 of the body 402 extends across an upper portion of the gap 404 and blocks areas between the drive bands 420, 421 and the rollers 406, 408 that form pinch points. The presence of the upper portion 410 of the body 402 in the space between the upper runs 533 (see FIG. 25) of the drive bands 420, 421 and the rollers 406, 408 reduces the size of the space that an object, such as a glove, could be positioned which reduces the risk of an object becoming pinched between the drive bands 420, 421.

With the drive member protector 400 inserted between the rollers 406, 408 as will be described further hereinafter, the body 402 has an intermediate portion 423 configured to be positioned in the narrowest portion of the gap 404 and a lower portion 424 below the intermediate portion 423 and which is thus located below the narrowest portion of the gap 404. The upper portion 410 and the lower portion 424 have longitudinal dimensions across the gap 404 extending in a longitudinal direction along the length of the rollers 406, 408 with the longitudinal dimensions being larger than the gap 404 at the narrowest portion thereof to resist unintentional dislodgement of the drive member protector 400 out of the gap 404.

As illustrated, the intermediate and lower portions 423 and 424 of the body 402 can include longitudinally spaced leg portions 426, 428 depending from the upper portion 410 and having a space 490 therebetween. In one embodiment, one or more of the leg portions 426, 428 are resilient and may be deflected to advance the leg portions 426, 428 into the gap 404. The leg portions 426, 428 have contact portions 430, 432 at their distal ends that are configured to be in clearance with cylindrical outer surfaces 434, 436 of the rollers 406, 408. In one embodiment, the contact portions 430, 432 have a running fit with the cylindrical outer surfaces 434, 436. The contact portions 430, 432 may generally be in clearance with outer cylindrical surfaces 434, 436 of the rollers 406, 408 during operation of the conveyor system 409. If an object being conveyed by the conveyor system 409 impacts or contacts the upper portion 410 of the drive member protector 400, the contact portions 430, 432 may contact one or both of the cylindrical surfaces 434, 436 as the drive member protector 400 settles back into an operating position in the gap 404 once the object has traveled downstream past the drive member protector 400.

Figure 20:
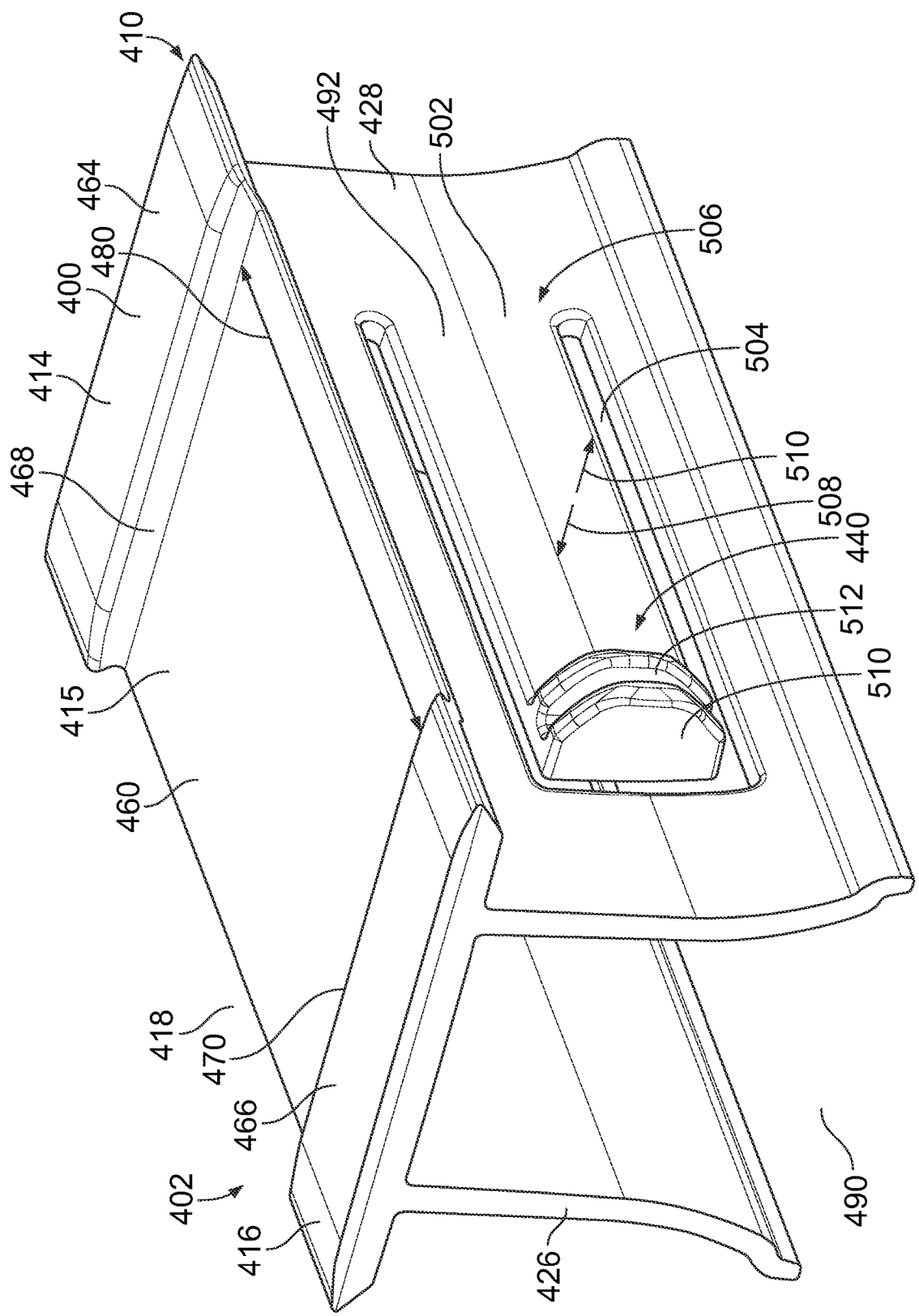
FIG. 20 is a perspective view of the drive member protector of FIG. 19 showing leg portions of the drive member protector, wherein one of the leg portions includes a locating member having a groove engaging portion configured for engaging a groove of one of the rollers of FIG. 19.
Figure 21:
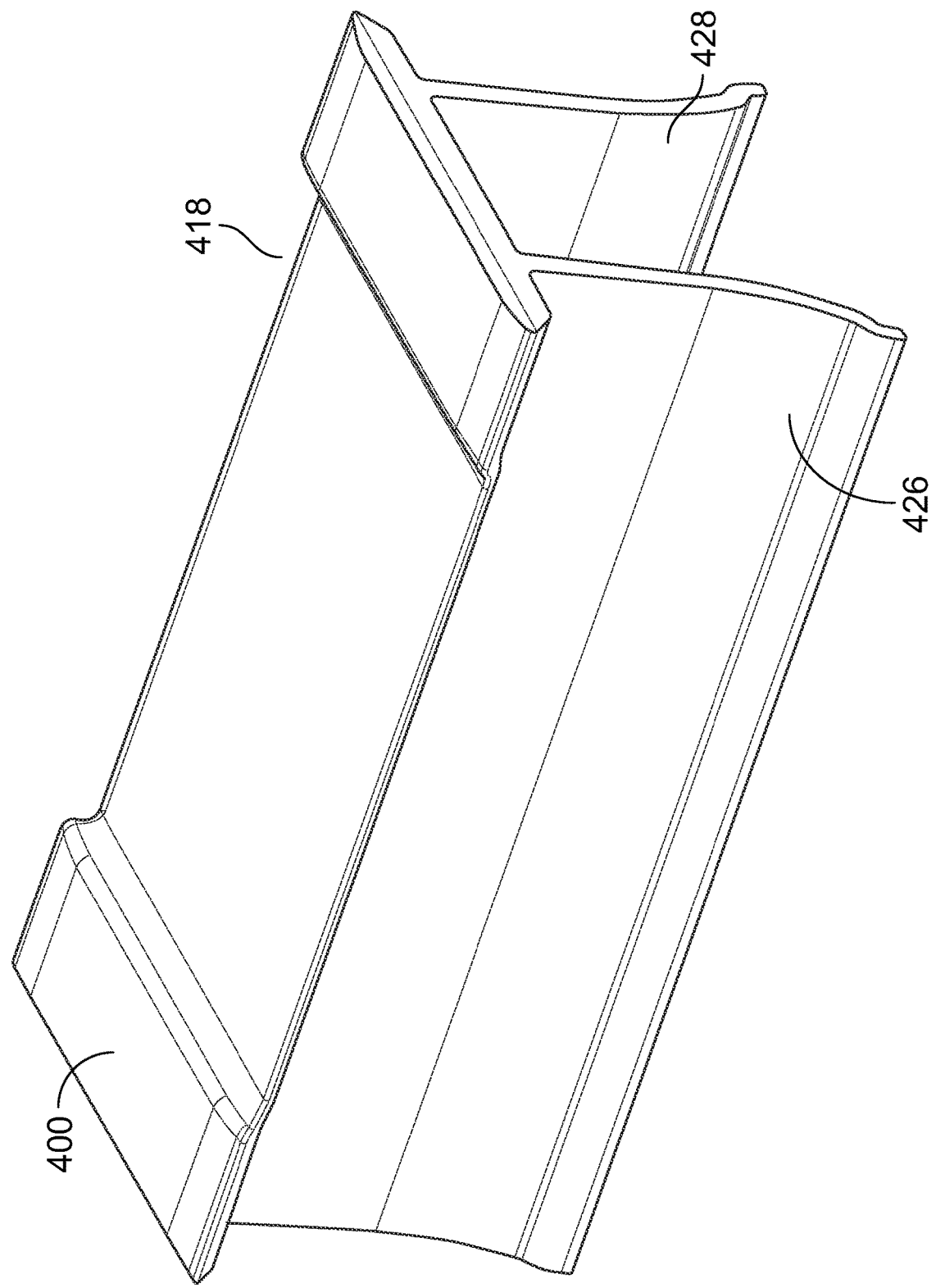
FIG. 21 is a perspective view of the drive member protector of FIG. 19 showing the other leg portion without a groove engaging portion.
Figure 24:
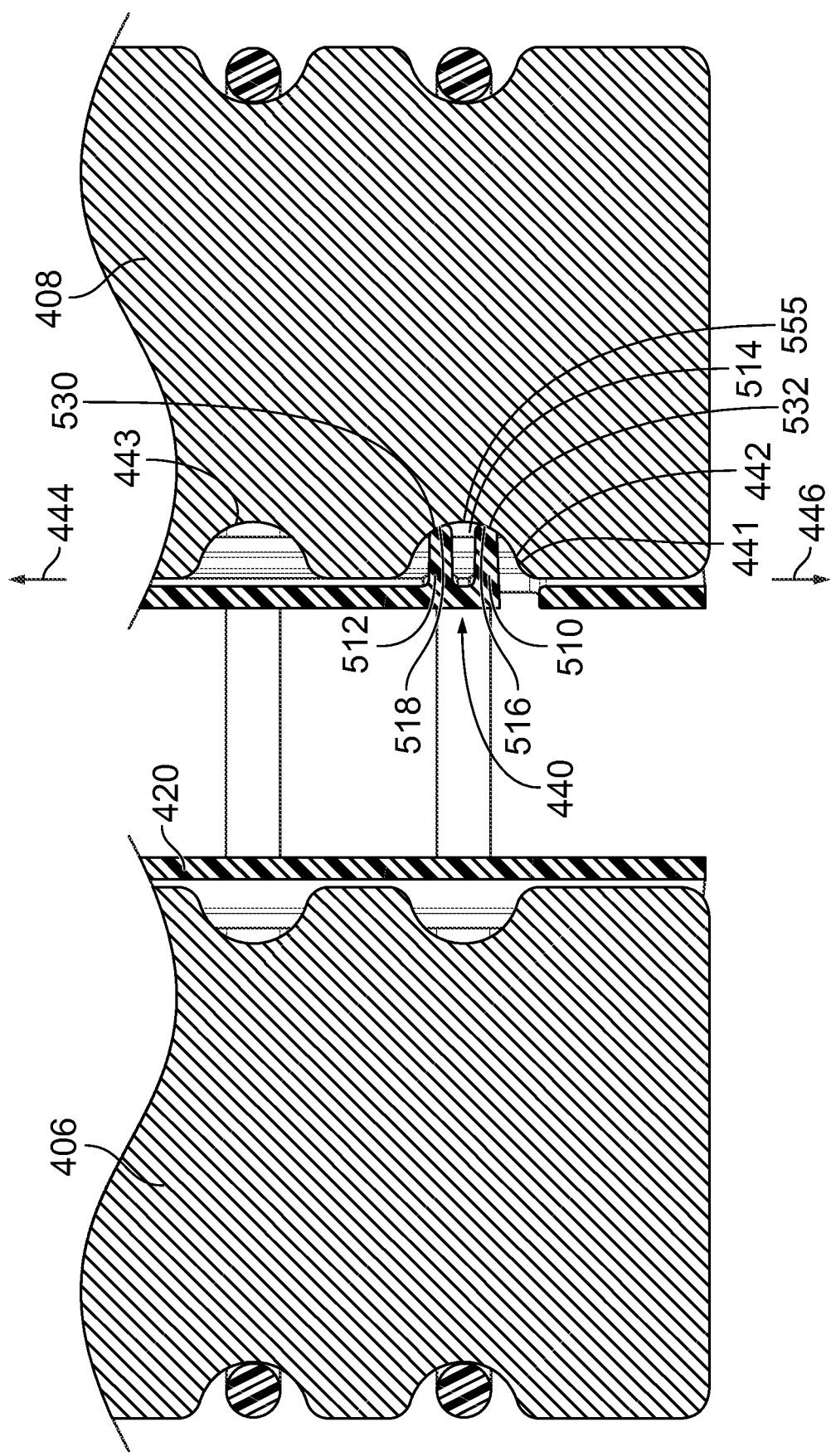
FIG. 24 is a cross-sectional view taken across line 24-24 in FIG. 19 showing the walls of the locating member engaging in the roller groove so that the walls are on either side of a central most recessed surface portion of the groove.

With respect to FIGS. 20 and 24, the downstream leg portion 428 includes a groove engaging portion 440, such as one or more projecting members, that is configured to extend into a groove 442 (see FIG. 19) of the roller 408 and resist lateral movement of the drive member protector 400 in lateral directions 444, 446 relative to the rollers 406, 408. The upstream leg portion 426 is shown in FIG. 21 without a groove engaging portion such that the drive member protector 400 is in register with the groove 442 of the downstream roller 408 to resist lateral movement of the drive member protector 400 but in not in register with the grooves 442A, 443A of the upstream roller 406. In other embodiments, the orientation of the drive member protector 400 may be reversed with the leg portion 428 proximate an upstream roller and the groove engaging portion 440 engaged with a groove of an upstream roller.

The rollers 406, 408 are shown in FIG. 19 without a lateral offset. More specifically, the rollers 406, 408 have ends 447, 449 that are even with one another and the grooves 443, 443A and 442, 44A of the rollers 406, 408 are aligned in downstream longitudinal direction 539. In FIG. 19, upper runs 533, 534 and lower runs 536, 538 of the drive bands 420, 421 extend across the gap 404 in the downstream longitudinal direction 539.

But in some instances, the roller 406 may be laterally offset from the roller 408, such as up to 0.5 inches For example, the roller 408 may be in the position shown in FIG. 19 but the upstream roller 406 is shifted in lateral direction 451 from the position shown in FIG. 19. The lateral offset of the rollers 406, 408 may be due, for example, to the configuration of a frame of the roller conveyor 409 or due to the frame deforming over time such that the rollers 406, 408 are no longer aligned. The lateral offset between the rollers 406, 408 causes the grooves 442, 443 of the downstream roller 408 to be misaligned or laterally offset from grooves 442A, 443A of the upstream roller 406 (see FIG. 19). Because the groove engaging portion 440 of the drive member protector 400 is in register with the groove 442 of the downstream roller 408, but not with a groove of the upstream roller 406, installation of the drive member protector 400 is unaffected by the lateral misalignment of the grooves 443, 443A and 442, 442A. During installation, the groove engaging portion 440 will thereby properly engage in the groove 442 so that the groove engaging portion 440 will function to resist lateral movement of the drive member protector 400 whether the grooves 443, 443A and 442, 442A are longitudinally aligned or laterally offset from one another.

In the event of a lateral offset between the rollers 406, 408, the upper runs 533, 534 and lower runs 536, 538 of the drive bands 420, 421 extend in and through the recess 418 of the drive member protector 400 transversely relative to the downstream lateral direction 539. Referring to FIG. 20, the recess 418 has a distance 480 thereacross between the raised portions 414, 416. The distance 480 is sized so that the upper runs of the drive bands 420, 421 still travel through the recess 418 spaced from the raised portions 414, 416 even if the rollers 406, 408 are laterally offset by up to, for example 0.5 inches, where the drive band upper runs 533, 534 extend obliquely across the upper clearance portion 412 of the drive member protector 400.

Continuing reference to FIG. 20, the upper clearance portion 412 has a bottom surface, such as a lowered or recessed clearance surface 460, that is configured to extend below and in clearance with the drive bands 420 during operation of the conveyor system 409. The clearance surface 460 provides a support for the upper runs 533, 534 of the drive bands 420, 421 by limiting downward vertical deflection of the drive band upper portions 533, 534 in the event an object contacts the drive band upper portions 533, 534 and urges one or both of the drive band upper portions 533, 534 downward into contact with the upper clearance surface 460.

Figure 22:
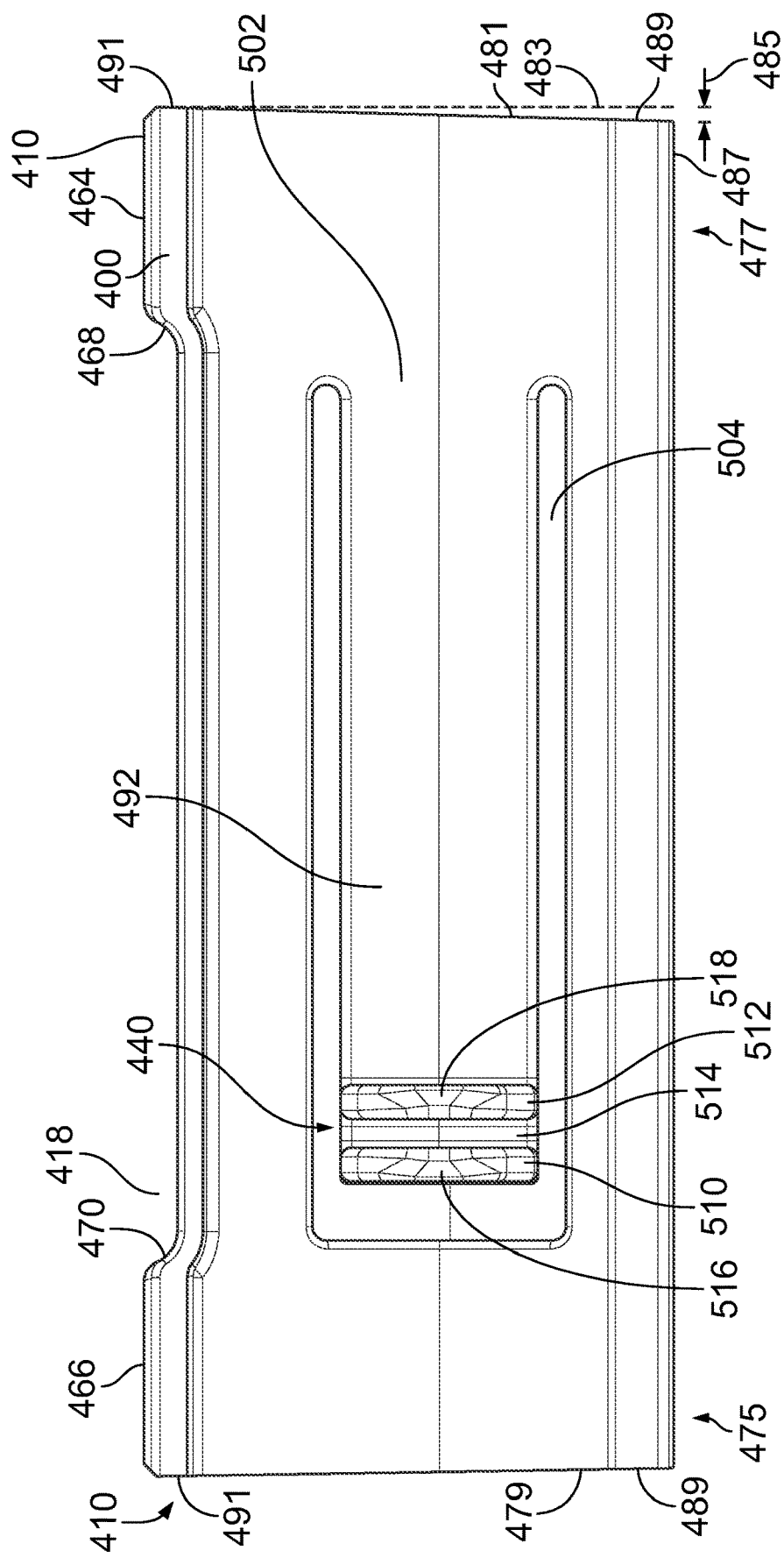
FIG. 22 is an elevational view of the drive member protector of FIG. 20 showing the groove engaging portion of the locating member including a pair of walls at a distal end portion of the locating member.

With reference to FIG. 22, the raised portions 414, 416 have upper surface portions 464, 466 that may contact objects being conveyed across the gap 404 and support the object as it travels toward the downstream roller 408. The raised portions 414, 416 also include side surfaces 468, 470 which, together with the clearance surface 460, from a step profile at either end of the upper portion 410. As shown, the upper surface portions 464, 466 can have a substantially flat configuration and generally extend horizontally, and the side surfaces 468, 470 can be at an incline and have a slight curvature as they extend downwardly to the recessed clearance surface 460 at the bottom of the wide channel 415.

In one embodiment, the drive member protector 400 has opposite lateral end portions 475, 477 with longitudinally extending side surfaces 479, 481 that taper laterally inward as the side surfaces 479, 481 extend from the upper end portion 410 toward a bottom 487 of the drive member protector 400. The inward lateral taper of the surfaces 479, 481 causes lower portions 489 of the side surfaces 479, 481 to each be offset laterally inward a distance 485 from an upper portions 491 of the respective side surface 479, 481, as shown relative to a vertical axis 483 in FIG. 22. The drive member protector 400 may be made of, for example, a plastic material and may be made using various approaches, such as additive manufacturing or molding such as injection molding. The inward lateral taper of the surfaces 479, 481 facilitates injection molding of the drive member protector 400 by making the drive member protector 400 easier to remove from the mold.

Figure 26:
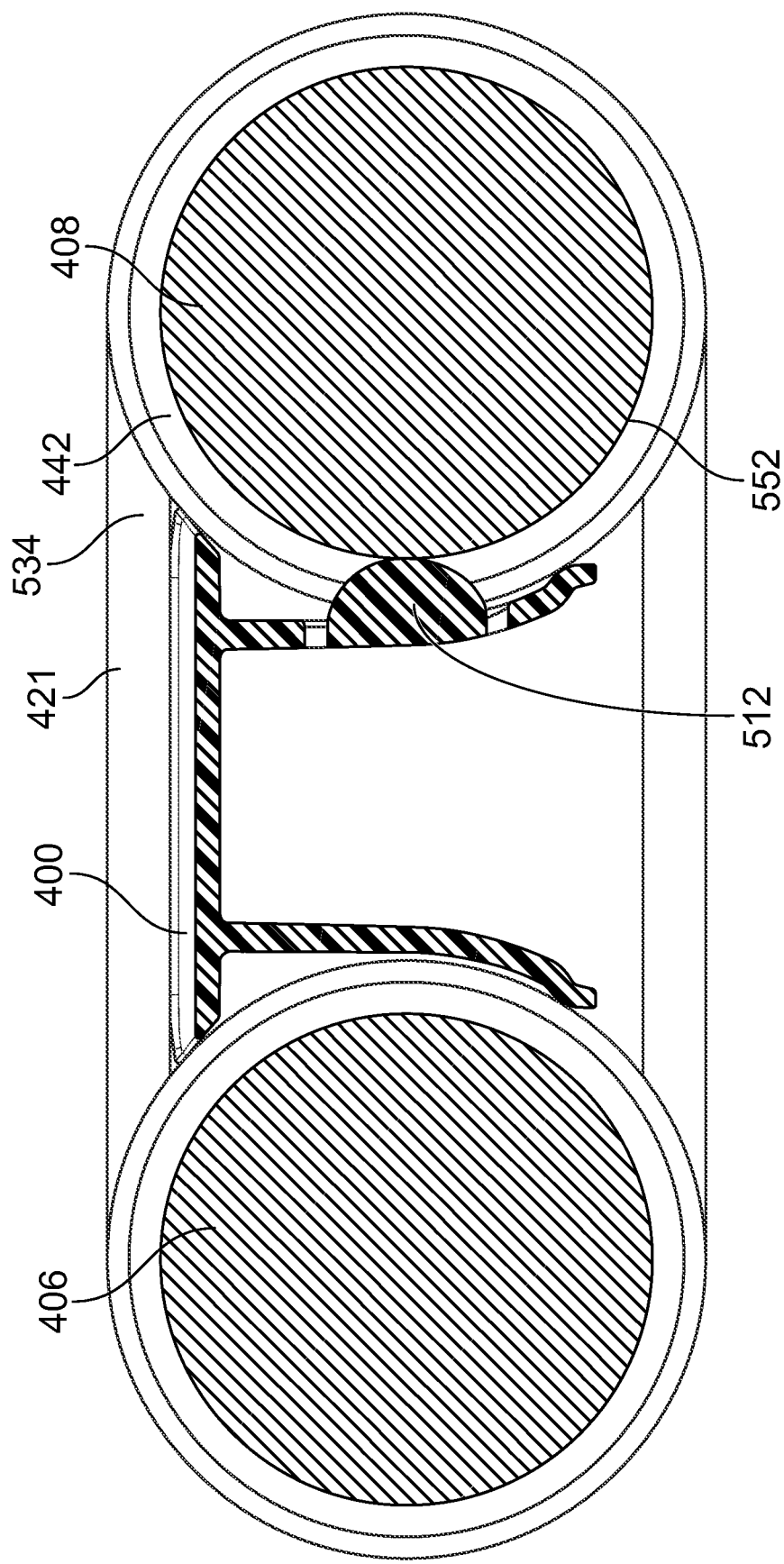
FIG. 26 is a cross-sectional view taken across line 26-26 in FIG. 19 showing one of the walls of the groove-engaging portion of the drive member protector extending into the groove of one of the rollers.

With reference to FIG. 22, the leg portion 428 has a locating member 492 with a free end portion 500 that includes the groove engaging portion 440 and a base portion 502 opposite the free end portion 500. The locating member 492 is formed in the leg portion 428 via a slotted through opening 504 that extends about a periphery of the locating member 492. The locating member 492 has a living hinge portion 506 where the locating member 492 remains connected to the rest of the leg portion 428. The living hinge portion 506 permits the groove engaging portion 440 to resiliently shift longitudinally in direction 506, 508 (see FIG. 20) as the drive member protector 400 is positioned into the gap 404. In one embodiment, the groove engaging portion 440 extends radially into the groove 442 at the narrowest portion of the gap 404, as shown in FIG. 26.

In one approach for installing the drive member protector 400 in the gap 404, an installer positions the drive member protector 400 above the gap 404 laterally offset from the drive bands 420, 421 along the rollers 406, 408 (e.g., to the left of the drive bands 420, 421 in FIG. 19). The installer then tilts the drive member protector 400 so that one of the leg portions 426, 428 is lower than the other leg portion 426, 428 and advances the lower leg portion 426, 428 first into the gap 404 followed by the higher leg portion 426, 428. As the installer continues to advance the leg portions 426, 428 into the gap 404, the installer urges the higher leg portion 426, 428 toward the lower leg portion 426, 428 to temporarily narrow the longitudinal spacing between the leg portions 426, 428 and permit the distal ends leg portions 426, 428 to fit through the narrowest portion of the gap 404 between the rollers 406, 408.

Once the distal ends of both leg portions 426, 428 have been advanced beyond the narrowest portion of the gap 404, the installer seats the upper portion 410 of the drive member protector 404 on the rollers 406, 408. With the upper portion 410 seated on the rollers 406, 408, the upper surface portions 464, 466 (see FIG. 22) are lower than the upper runs 533, 534 of the drive bands 420, 421.

Next, the installer urges the leg portions 426, 428 together and shifts the drive member protector 400 laterally in the gap 404 along the rollers 406, 408 and toward the drive bands 420, 421 so that the drive member protector 400 travels lengthwise into openings 535 (see FIG. 19) formed between the drive band upper runs 533, 534, drive band lower runs 536, 538, and the rollers 406, 408. The installer continues to advance the drive member protector 400 laterally in the gap 404 until the wide channel 415 is positioned below the drive bands 420, 421 and the groove engaging portion 440 is longitudinally aligned with the groove 442. The installer may then release the leg portions 426, 428 and permit the grove engaging portion 440 to snap into the groove 442. The leg portions 426, 428 thereafter keep the drive member protector 400 in the gap 404. Further, the tongue-and-groove engagement of the groove engaging portion 440 and the groove 442 (see FIG. 24) maintains the drive member protector 400 in a predetermined lateral location along the rollers 406, 408 wherein the wide channel 415 is longitudinally aligned with the drive band upper runs 533, 534.

In one embodiment, the groove engaging portion 440 includes one or more protrusions, such as ribs or walls 510, 512, and a spacing 514 therebetween as shown in FIG. 22. In FIGS. 20 and 26, it can be seen that the walls 510, 512 generally can have a semi-circular configuration. Referring to FIGS. 22 and 24, each wall 510, 512 has a surface portion 516, 518 that engages side surface portions 530, 532 of the groove 442. The spacing 514 is radially aligned with a central surface portion 555 of the groove 442 which is the most recessed portion of the groove 442 so that when the walls 510, 512 are positioned in the groove 442 they are on either side of the central surface portion 555. In this manner, the walls 516, 518 engage the side surface portions 530, 532 at laterally spaced apart positions along the inner surface 441 of the groove 442. In this manner, the walls 516, 518 secure the drive member protector 400 against lateral movement in the gap 404 while causing a minimal frictional resistance to rotation of the roller 408.

Figure 23:
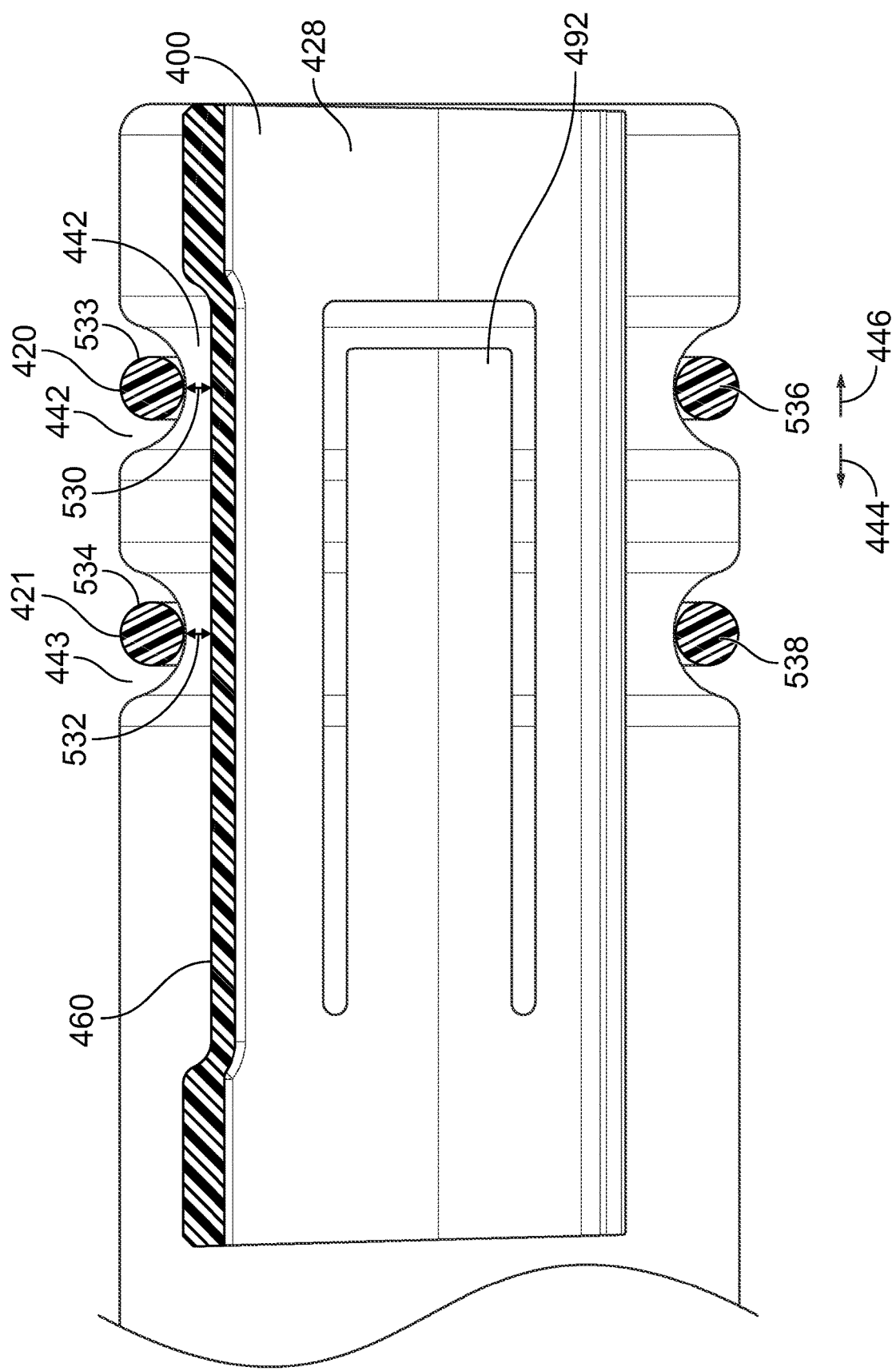
FIG. 23 is a cross-sectional view taken across line 23-23 in FIG. 19 showing the groove engaging portion of the locating member aligned with the groove of one of the rollers.
Figure 25:
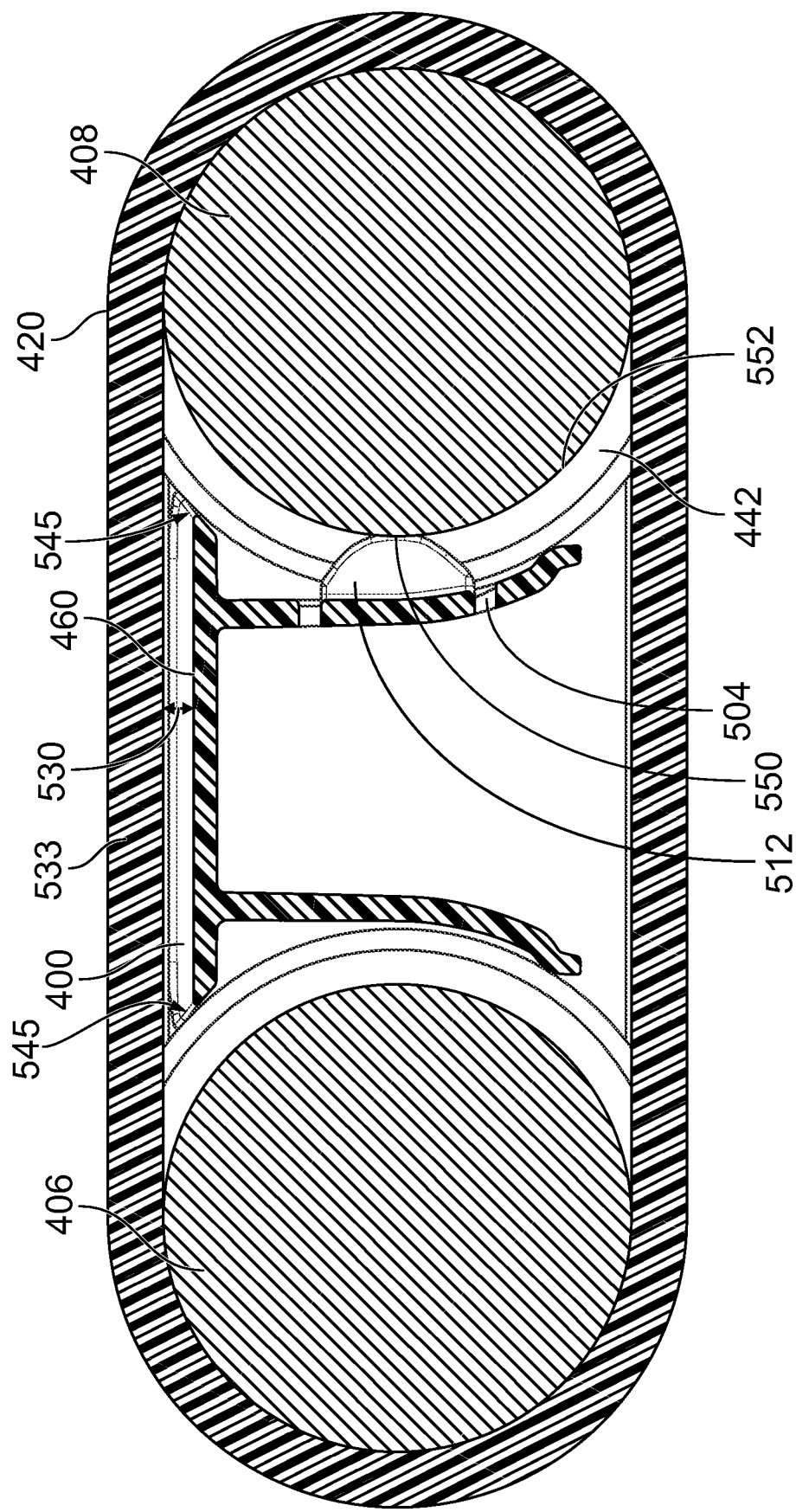
FIG. 25 is a cross-sectional view taken across line 25-25 in FIG. 19 showing a clearance surface portion at the bottom of the wide recess of the wide channel of the drive member protector extending below and in clearance with one of the drive bands.

With reference to FIGS. 23 and 25, the upper clearance surface 460 is at a distance 530 below the upper portion 532 of the drive band 420 in groove 442 and a similar distance 532 below the upper portion 534 of the drive band 421 in groove 443. The distances 530, 532 are selected to minimize pinch areas between the drive bands 420, 421 and the roller 508 while providing adequate clearance for the drive bands 420, 421 to travel across the drive member protector 400 in clearance with the drive member protector 400. The distances 530, 532 are relatively small, such as less than the diameters of the respective drive bands 420, 421, so that the upper portion 410 of the drive member protector 400 takes up almost all of spaces 545 between the upper runs 533, 534 of the drive bands 420, 421 and the grooves 442, 443. Because the upper portion 410 of the drive member protector 400 takes up almost all of the spaces 545, there is less space for an object such as a glove to be pinched between either of the drive bands 420, 421 and the drive member protector 400.

With reference to FIGS. 25 and 26, it can be seen that the wall 518 may protrude generally radially into the groove 442 of the roller 408. The wall 516 protrudes similarly into the groove 448, but is not shown in FIG. 25 due to the position of the cross-section. The walls 516, 518 have distal end portions 550 on either side of the central surface portion 552 of the groove 442, as previously discussed. The radially inner end portion 550 of the walls 516, 518 may be in contact with or spaced from the central recessed surface portion 552 depending on the particular application.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A gap blocker for a roller conveyor having rollers for conveying an object in a downstream longitudinal direction, the rollers including a pair of adjacent rollers having a longitudinally extending gap therebetween and one of the adjacent rollers having an annular groove for receiving a drive member, the gap blocker comprising:
   a unitary body having a one-piece construction and configured to be supported in the gap by the adjacent rollers;
   an upper blocking portion of the unitary body to extend across the gap;
   a locating member of the unitary body configured to extend into the annular groove and inhibit lateral movement of the unitary body in the gap; and
   a contact portion of the upper blocking portion configured to slidingly contact the one of the adjacent rollers lateral to the annular groove and support the unitary body in the gap as the adjacent rollers rotate during operation of the roller conveyor.

2. The gap blocker of claim 1 wherein the unitary body includes a resilient portion connecting the upper blocking portion and the locating member, the resilient portion of the unitary body permitting the locating member to resiliently shift relative to the upper blocking portion for positioning the unitary body in the gap.

3. The gap blocker of claim 1 wherein the locating member is below the upper blocking portion with the unitary body supported in the gap by the adjacent rollers.

4. The gap blocker of claim 1 wherein the upper blocking portion includes another contact portion for slidingly contacting another one of the adjacent rollers above a narrowest portion of the gap between the adjacent rollers;
wherein the unitary body includes a lower portion configured to slidingly contact at least one of the adjacent rollers below the narrowest portion of the gap during roller conveyor operation; and
wherein the locating member includes a protrusion vertically intermediate the upper blocking portion and the lower portion that extends into the annular groove of the one of the adjacent rollers.

5. The gap blocker of claim 1 wherein the locating member includes a protrusion to extend into the annular groove, the protrusion having a thickness in a lateral direction that is less than a maximum lateral width of the annular groove.

6. The gap blocker of claim 1 wherein the locating member includes a pair of protrusions configured to contact opposite lateral sides of the annular groove.

7. The gap blocker of claim 1 wherein the locating member includes a pair of laterally spaced wall portions configured to contact opposite lateral sides of the annular groove.

8. The gap blocker of claim 1 wherein the locating member includes a pair of laterally spaced apart surface portions to engage lateral side surface portions of the annular groove and a recess laterally intermediate the surface portions of the locating member.

9. The gap blocker of claim 1 wherein the locating member includes a convex surface portion configured to engage a concave surface portion of the annular groove.

10. The gap blocker of claim 1 wherein the locating member includes a generally arcuate edge configured to extend into the annular groove.

11. The gap blocker of claim 1 wherein the unitary body includes a resilient leg portion extending downwardly; and
wherein the resilient leg portion includes the locating member.

12. The gap blocker of claim 11 wherein the locating member comprises a free end portion of the resilient leg portion.

13. The gap blocker of claim 11 wherein the resilient leg portion includes a slotted through opening defining a periphery of the locating member, the locating member including a base portion and a free end portion, the free end portion having a protrusion to extend into the annular groove.

14. The gap blocker of claim 1
wherein the unitary body includes lower leg portions spaced longitudinally from one another.

15. The gap blocker of claim 1 wherein the locating member includes an upper locating member configured to extend in the groove above a narrowest portion of the gap between the adjacent rollers and a lower locating member configured to extend in the groove below the narrowest portion of the gap with the unitary body supported in the gap by the adjacent rollers.

16. The gap blocker of claim 1 wherein the upper blocking portion includes a recess to be positioned below an upper run of the drive member and raised portions extending along either side of the recess.

17. The gap blocker of claim 1 wherein the locating member includes a first locating member configured to extend into the annular groove of the one of the adjacent rollers and a second locating member configured to extend into an annular groove of another one of the adjacent rollers.

18. A drive member protector for a roller conveyor having rollers, a gap between a pair of adjacent rollers, and a drive member for rotating the adjacent rollers, the adjacent rollers each having an annular groove to receive the drive member and an outer surface extending laterally from the annular groove, the drive member protector comprising:
a unitary body having a one-piece configuration, the body configured to be supported in the gap by the adjacent rollers;
an upper portion of the unitary body having a recess to be positioned below an upper run of the drive member;
raised portions of the upper portion extending along either side of the recess to inhibit ingress of an object between the drive member and the upper portion of the unitary body;
upstream and downstream contact portions of the upper portion of the unitary body configured to slidingly contact the outer surfaces of the adjacent rollers lateral to the annular grooves and support the unitary body in the gap as the adjacent rollers rotate during operation of the roller conveyor.

19. The drive member protector of claim 18 wherein the upper portion of the unitary body includes a channel comprising the recess, the raised portions, and a clearance surface extending between the raised portions.

20. The drive member protector of claim 18 wherein the raised portions include flat uppermost surfaces.

21. The drive member protector of claim 20 wherein the raised portions have side surface portions on either side of the recess and upper, corner junctures between the side surfaces portions and the flat uppermost surfaces.

22. The drive member protector of claim 18 wherein the recess has a length for extending between the rollers orthogonal to axes of rotation of the rollers and a width perpendicular to the length that is shorter than the length of the recess.

23. The drive member protector of claim 18 wherein the unitary body includes a protrusion configured to extend into a drive member-receiving groove of one of the adjacent rollers and maintain the unitary body at a predetermined lateral location along the rollers.

24. The drive member protector of claim 18 wherein the unitary body includes a pair of lower protector members configured to extend along either side of a lower run of the drive member with the body positioned in the gap.

25. The drive member protector of claim 18 wherein the unitary body includes an upstream leg portion configured to extend along one of the rollers and a downstream leg portion spaced from the upstream leg portion configured to extend along the other roller.

26. A drive member protector for a roller conveyor having rollers, a gap between a pair of adjacent rollers, and a drive member for rotating the adjacent rollers, the drive member protector comprising:
a body configured for being positioned in the gap;
an upper portion of the body having a recess to be positioned below an upper run of the drive member;
raised portions of the upper portion extending along either side of the recess to inhibit ingress of an object between the drive member and the upper portion of the body;
wherein the recess has a width in a lateral direction for extending along axes of rotation of the adjacent rollers that is larger than a diameter of the drive member; and wherein the raised portions each have a raised portion width in the lateral direction that is the same or greater than the diameter of the drive member.

27. A drive member protector for a roller conveyor having rollers, a gap between a pair of adjacent rollers, and a drive member for rotating the adjacent rollers, the drive member protector comprising:
    a body configured for being positioned in the gap;
    an upper portion of the body having a recess to be positioned below an upper run of the drive member;
    raised portions of the upper portion extending along either side of the recess to inhibit ingress of an object between the drive member and the upper portion of the body;
    wherein the raised portions each have a raised portion width in a lateral direction for extending along axes of rotation of the adjacent rollers; and
    wherein the recess has a recess width in the lateral direction that is greater than a sum of the raised portion widths.

28. The drive member protector of claim 26 wherein the raised portions include side surfaces defining at least a portion of the recess; and
    wherein the upper portion of the body includes a recessed surface extending between the side surfaces and defining at least a portion of the recess.

29. The drive member protector of claim 26 wherein the raised portions include flat uppermost surfaces.

30. The drive member protector of claim 29 wherein the raised portions have side surface portions on either side of the recess and upper, corner junctures between the side surfaces portions and the flat uppermost surfaces.

31. The drive member protector of claim 26 wherein the body includes a protrusion configured to extend into a drive member-receiving groove of one of the adjacent rollers and maintain the body at a predetermined lateral location along the rollers.

32. The drive member protector of claim 26 wherein the body includes a pair of lower protector members configured to extend along either side of a lower run of the drive member with the body positioned in the gap.

33. The drive member protector of claim 26 wherein the body includes an upstream leg portion configured to extend along one of the rollers and a downstream leg portion spaced from the upstream leg portion configured to extend along the other roller.

34. The drive member protector of claim 26 wherein the body has a unitary, one-piece construction.

35. The drive member protector of claim 26 wherein the body includes upper contact portions configured to slidingly contact the adjacent rollers and support the body in the gap as the adjacent rollers rotate during operation of the roller conveyor.

36. The drive member protector of claim 26 wherein the body includes a plurality of laterally spaced upstream lower members having upstream free end portions to be positioned below a narrowest portion of the gap; and
    wherein the body includes a plurality of laterally spaced downstream lower members having downstream free end portions to be positioned below the narrowest portion of the gap.

37. A roller conveyor system comprising:
    an upstream roller having an upstream groove and an upstream outer surface extending laterally from the upstream groove;
    a downstream roller having a downstream groove and a downstream outer surface extending laterally from the downstream groove;
    the upstream and downstream rollers rotatable to convey an object in a downstream longitudinal direction;
    a gap between the upstream and downstream rollers;
    a drive member engaged in the upstream and downstream grooves of the upstream and downstream rollers and having an upper run that travels in the downstream longitudinal direction and a lower run that travels in an upstream longitudinal direction;
    a gap blocker having upper contact portions supported on the upstream and downstream outer surfaces of the upstream and downstream rollers in the gap lateral to the upstream and downstream grooves, the upper contact portions configured to slidingly contact the upstream and downstream outer surfaces as the upstream and downstream rollers rotate during operation of the roller conveyor system; and
    engaging portions of the gap blocker and at least one of the upstream and downstream grooves that resist lateral movement of the gap blocker along the upstream and downstream rollers.

38. The roller conveyor system of claim 37 wherein the engaging portions include surfaces of the gap blocker and the at least one of the upstream and downstream grooves that overlap in a lateral direction.

39. The roller conveyor system of claim 37 wherein the engaging portions of the gap blocker and the at least one of the upstream and downstream grooves includes engaging portions of the gap blocker and both of the upstream and downstream grooves.

40. The roller conveyor system of claim 37 wherein the engaging portions include a protrusion of the gap blocker extending into the at least one of the upstream and downstream grooves.

41. The roller conveyor system of claim 37 wherein the drive member is a drive band and the upper run of the drive band travels from the upstream groove of the upstream roller to the downstream groove of the downstream roller; and
    wherein the gap blocker includes a channel below the upper run.

42. The roller conveyor system of claim 37 wherein the gap blocker includes a channel below the upper run of the drive member; and
    wherein the engaging portions of the gap blocker and the at least one of the upstream and downstream grooves maintain the gap blocker in a predetermined lateral location along the rollers so that the channel remains below the upper run of the drive member.

43. The roller conveyor system of claim 37 wherein the gap blocker includes an upper blocking portion extending longitudinally across the gap, the upper blocking portion having a recess below the upper run of the drive member and raised portions extending along either side of the recess.

44. The roller conveyor system of claim 37 wherein the gap blocker comprises:
    raised portions extending along either side of the upper run of the drive member having upper surfaces;
    a clearance surface below the upper run of the drive member;
    corner junctures between upper surfaces of the raised portions and the clearance surface; and
    the raised portions are sized to keep a size of a space between the corner junctures and the upper run of the drive member to a minimum to keep objects from fitting into the space.

45. The roller conveyor system of claim 37 wherein the upstream groove includes a pair of upstream grooves, the downstream groove includes a pair of downstream grooves, and the drive member includes a pair of drive members each having an upper run; and wherein the gap blocker includes a channel below the upper runs of the drive members and raised portions extending along opposite sides of the channel.

46. The roller conveyor system of claim 37 wherein the drive member comprises an o-ring of resilient material.

47. The roller conveyor system of claim 37 wherein the drive member comprises a drive band.

48. The roller conveyor system of claim 37 wherein the upstream and downstream rollers are rotatable around respective axes that remain stationary while the upstream and downstream rollers rotate to convey an object.

49. The roller conveyor system of claim 37 wherein the upstream and downstream rollers are rotatably mounted to a stationary conveyor frame such that the upstream and downstream rollers are rotatable to convey an object while the conveyor frame remains stationary.

* * * * *